US010948566B1

(12) United States Patent
Harbin et al.

(10) Patent No.: US 10,948,566 B1
(45) Date of Patent: Mar. 16, 2021

(54) GPS-ALTERNATIVE METHOD TO PERFORM ASYNCHRONOUS POSITIONING OF NETWORKED NODES

(71) Applicant: Oceanit Laboratories, Inc., Honolulu, HI (US)

(72) Inventors: Donald Harbin, Mililani, HI (US);
Ryan Miyamoto, Honolulu, HI (US);
Erin Horner, Honolulu, HI (US);
David Siu, Honolulu, HI (US);
Christopher Sullivan, Honolulu, HI (US); Derek Ah Yo, Honolulu, HI (US);
Ken Cheung, Kailua, HI (US)

( * ) Notice: Subject to any disclaimer, the term of this patent is extended or adjusted under 35 U.S.C. 154(b) by 609 days.

(21) Appl. No.: 15/007,155

(22) Filed: Jan. 26, 2016

Related U.S. Application Data

(60) Provisional application No. 62/107,306, filed on Jan. 23, 2015.

(51) Int. Cl.
| | | |
|---|---|---|
| *G01S 5/10* | (2006.01) | |
| *G01S 5/06* | (2006.01) | |
| *G01S 5/02* | (2010.01) | |
| *H04W 4/02* | (2018.01) | |
| *H04W 88/04* | (2009.01) | |
| *H04W 64/00* | (2009.01) | |

(52) U.S. Cl.
CPC .............. *G01S 5/10* (2013.01); *G01S 5/0289* (2013.01); *G01S 5/06* (2013.01); *H04W 4/025* (2013.01); *G01S 5/021* (2013.01); *H04W 64/00* (2013.01); *H04W 88/04* (2013.01)

(58) Field of Classification Search
CPC ...... G01S 5/021; G01S 5/0009; G01S 5/0215; G01S 5/0273; G01S 5/0221; G01S 13/003; G01S 13/878; G01S 19/13; G01S 5/02; G01S 19/428; G01S 19/42; G01S 19/51; G01S 3/023; G01S 5/0289; G01S 5/06; G01S 19/10; G01S 19/48; H04W 64/00; H04W 4/02; H04W 56/0055; H04W 4/025
USPC ........................................... 455/456.1–456.6
See application file for complete search history.

(56) References Cited

U.S. PATENT DOCUMENTS

| | | | | |
|---|---|---|---|---|
| 4,595,925 A | * | 6/1986 | Hansen ................... | G01S 13/46 342/120 |
| 8,862,430 B2 | * | 10/2014 | Nam ......................... | G01S 5/06 702/150 |
| 9,686,765 B2 | * | 6/2017 | Sen ........................ | H04W 64/00 |

(Continued)

*Primary Examiner* — Olumide Ajibade Akonai
(74) *Attorney, Agent, or Firm* — Fresh IP PLC; Clifford D. Hyra; Aubrey Chen

(57) ABSTRACT

A new asynchronous localization method for a network of nodes and transmitters, the position of at least one of the nodes and/or transmitters being known, involves receiving a first signal directly from a first transmitter at a first node of a first node pair, receiving the first signal relayed from a second node of the first node pair at the first node, and determining the delay at the first node between the direct and relayed first signal by comparing the direct and relayed first signals. This may be repeated with the first node acting as relay to determine the delay at the second node. Time difference of arrival and/or time of flight between first and second nodes may be determined using the determined delay at the first and/or second node and/or known node locations. The process is repeated for additional transmitters/node pairs until sufficient information is determined for desired applications.

22 Claims, 19 Drawing Sheets

(a)

(b)

(56) References Cited

U.S. PATENT DOCUMENTS

| | | | | |
|---|---|---|---|---|
| 2002/0089450 | A1* | 7/2002 | Dowdle | G01S 5/02 |
| | | | | 342/453 |
| 2006/0029009 | A1* | 2/2006 | Alapuranen | G01S 5/0289 |
| | | | | 370/310 |
| 2006/0057958 | A1* | 3/2006 | Ngo | H04B 7/15592 |
| | | | | 455/7 |
| 2009/0006032 | A1* | 1/2009 | Wilcox | G01S 13/825 |
| | | | | 702/176 |
| 2009/0061899 | A1* | 3/2009 | Hwang | G01S 5/0018 |
| | | | | 455/456.2 |
| 2011/0116432 | A1* | 5/2011 | Doppler | H04B 7/155 |
| | | | | 370/312 |
| 2011/0183690 | A1* | 7/2011 | Kobayakawa | G01S 5/0215 |
| | | | | 455/456.5 |
| 2012/0081248 | A1* | 4/2012 | Kennedy | G01S 5/0242 |
| | | | | 342/118 |
| 2013/0163440 | A1* | 6/2013 | Issakov | G01S 5/06 |
| | | | | 370/246 |
| 2014/0303929 | A1* | 10/2014 | Khalaf-Allah | G01S 5/06 |
| | | | | 702/152 |
| 2015/0002334 | A1* | 1/2015 | Lim | G01S 19/10 |
| | | | | 342/357.47 |
| 2015/0185309 | A1* | 7/2015 | Pu | G01S 5/06 |
| | | | | 455/456.1 |

* cited by examiner

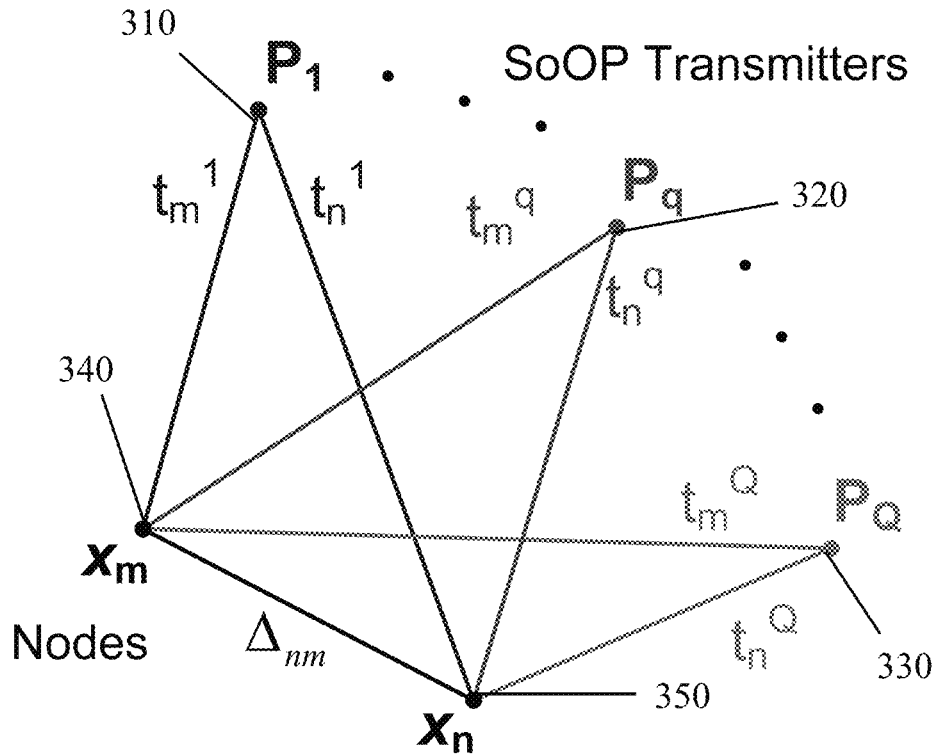

$Q \equiv$ # of SoOP Transmitters $\mathbf{P}_q \equiv$ Position vector of $q^{th}$ SoOP, $q=1, 2, ..., Q$ $N \equiv$ # of Nodes $\mathbf{x}_n \equiv$ Position vector of $n^{th}$ node, $n=1, 2, ..., N$ $K \equiv$ # of unknown Nodes in Case 4 LSOP $\mathbf{u}_k \equiv$ Position vector of $k^{th}$ node, $k=1, 2, ..., K$ $t_n^q \equiv$ Time of flight from $q^{th}$ SoOP to $n^{th}$ node $\tau_{nm}^q \equiv$ Time difference of arrival (TDOA) between $n^{th}$ and $m^{th}$ nodes from $q^{th}$ SoOP $\Delta_{nm} \equiv$ Time of flight (TOF) between $n^{th}$ and $m^{th}$ nodes $M \equiv$ # of dimensions to localize (2 or 3)

$c \equiv$ Free space speed of light

FIG. 3

GPS-ALTERNATIVE METHOD TO PERFORM ASYNCHRONOUS POSITIONING OF NETWORKED NODES

This application claims the benefit of U.S. Provisional Application No. 62/107,306, filed Jan. 23, 2015, which is hereby incorporated by reference in its entirety.

This Invention was made with Government support under Contracts FA9453-13-M-0137 and FA9453-14-M-0123 awarded by the U.S. Air Force. The Government has certain rights in this invention.

FIELD OF THE INVENTION

The application relates generally to positioning, navigation and timing (PNT), and particularly to military/battlefield positioning, surveying, GIS, navigation and collision avoidance.

BACKGROUND

Accurate positioning capability is an essential component of modern military tactics. Possessing real-time location information of friendly and hostile force positions enables effective attack and defense and allows accurate navigation of objectives in a safe and timely manner. Accurate position data also ensures optimum placement of munitions greatly minimizing the chances of local collateral damage and friendly fire incidents.

The most widely used method for determining location for US and allied forces is through the Global Positioning System (GPS). GPS uses a synchronous system to perform positioning (Satellite clocks and GPS receiver device's clocks have to be synchronized). GPS has a weak signal, and as such is vulnerable to signal degradation and denial due to noise or deliberate jamming. GPS also requires continuous communication with satellites and is vulnerable to loss of line-of-sight to the required number of GPS satellites due to the presence of nearby objects, such as in urban or mountainous areas, in dense foliage, underground, indoors, in outer space, etc.

The loss of GPS service can adversely impact the success of military missions where navigation, time on target and accurate placement of ordnance is essential.

In ASYNCHRONOUS DIFFERENTIAL TDOA FOR SENSOR SELF-LOCALIZATION, H. Howard Fan and Chunpeng Yan, Acoustics, Speech and Signal Processing, 2007. ICASSP 2007. IEEE International Conference on Acoustics, Speech and Signal Processing. Vol. 2., Apr. 15-20, 2007, Pages 1109-1112, Honolulu, Hi., non-GPS positioning techniques are described. These techniques claim to perform asynchronous positioning of nodes, but only relative to some other nodes. More than two nodes are required to perform positioning.

In SYSTEM AND METHOD FOR ASYNCHRONOUS WIRELESS POSITIONING BY ORDERED TRANSMISSION, U.S. Pat. No. 7,411,551, a non-GPS positioning technique is described. This technique claims it can perform asynchronous positioning of nodes, but only relative to some of other nodes and with more than two total nodes.

Needs exist for improved positioning methods and systems for non-GPS positioning.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A novel positioning method utilizes available signals of opportunity (SoOPs) received by several participating cooperative nodes to derive the location of those nodes. The use of multiple networked transceiver devices possessing the capability to receive and transmit SoOPs enables a new method of positioning and navigation. Synchronization of the receiver nodes or of the SoOPs is not necessary for this method to be effective, thereby opening up an existing planet-wide resource with an established and ubiquitous infrastructure to be used for localization.

Signals of Opportunity (SoOPs) such as commercial broadcast radio and TV signals and cell phone towers provide strong radio frequency (RF) emissions that can be received with standard RF front-end equipment already available in conventional communication radios. Even the same GPS jamming signals implemented by adversaries to deny military GPS operation can be used as SoOPs along with other electronic warfare signals such as radar and communication jamming signals. The challenge in using these for navigation is that the transmit towers and other various sources are not synchronized, nor do these signals provide timing information, making it impossible to measure time of flight (TOF) or time of arrival (TOA) information in a conventional fashion. A novel architecture as described herein can mitigate these challenges and effectively use the SoOPs for enhanced position location. The signal source of SoOPs could be any kind of transmitted/propagating energy (such as acoustics or electromagnetic or even transmissions within wires). For example, SoOPs can be acoustic energy (in e.g. submarine, subterranean, and aerial environments), non-RF electromagnetic energy such as lasers, signals within wires, and/or other electromagnetic propagation (in e.g. aerial, space/vacuum mediums).

The use of existing wireless transmitters is an attractive alternative to GPS. The powerful transmit signal from a radio tower is difficult to jam and much less susceptible to noise than GPS. In addition to its high power, the lower carrier frequency used in commercial broadcast transmission, for example, is capable of penetrating obstacles in urban areas and other cluttered environments where GPS has difficulty if line-of-sight to satellites is obscured.

One of the principal challenges for a localization system using SoOPs is the lack of timing information at the transmitters. A conventional solution to this would be to synchronize receivers so that the time-difference-of-arrival of the transmitted signal(s) may be measured and a multilateration solution calculated. It is, however, not feasible to maintain synchronization between receivers without using clocks disciplined with a common clock signal such as a beacon or by using expensive miniaturized atomic clocks at every receiver. The synchronization problem increases as receivers are added to the network. A new localization technique uses SoOPs with multiple unsynchronized receivers operating in a cooperative network.

A network-based asynchronous LSOP (Localization using Signals of Opportunity) algorithm in some embodiments is a novel localization technique utilizing SoOPs from RF transmitters. The technique derives the locations of a number of handheld receiver nodes by exploiting the signal from multiple SoOP transmitters in known locations. By allowing the nodes to share data in a cooperative network, the technique eliminates the need to synchronize transmitters or receivers. It also requires a minimum of only two nodes to perform positioning, and as little as three SoOPs, depending on the use scenario. The method obtains both Time Difference of Arrival (TDOA) and TOF of Node-SoOP geometry, which aids positioning. Although it does not require synchronized clocks, if coupled with a GPS-enabled receiver, the nodes can be positioned and their clocks may be synchronized (if desired) using fewer satellites than required by GPS.

The method is particularly useful whenever positioning similar to that provided by GPS is required, but where GPS is degraded or denied. For example, for positioning in dense urban or forested areas, indoors, underground, in outer space, in GPS jammed environments, etc. Exemplary applications include cell phone positioning, autonomous vehicle/drone positioning for navigation and/or collision avoidance, person/child positioning, and geo-fencing in retail. The method may be utilized in GPS devices (for example to provide backup positioning), cell phones, military radio and other equipment, etc.

This new approach offers advantages including:
Asynchronous operation: Synchronization of nodes is not required.
Requires a minimum of only a pair of nodes to perform localization.
Scalable: Large network of nodes can be localized simply by performing LSOP on pairs.
Operational benefits: adaptive node pairing to optimize GDOP, multipath mitigation, and other parameters; network can be repaired simply with new node pair assignments.
Firmware/Software solution: the technique can be implemented fully in firmware and/or software
hardware modification of existing radios are not required.
Low cost, low size, weight and power.

A new asynchronous localization method involves, in a network of nodes and one or more transmitters, including a first pair of nodes and a first transmitter, the position of at least one of the nodes in the first pair of nodes and/or the first transmitter being known, for the first pair of nodes and the first transmitter, (a) receiving a first signal directly from the first transmitter at a first node of the first pair of nodes, (b) receiving the first signal relayed from a second node of the first pair of nodes at the first node, (c) determining the delay at the first node between the direct first signal and the relayed first signal by comparing the direct and relayed first signals, and (d) determining at least one of the time difference of arrival and time of flight between the first and second nodes of the first node pair, in part using the determined delay at the first node. Other information that may be used in conjunction with the determined delay at the first node to make these determinations include known node positions or determined delay at the second node (for example, obtained by repeating steps (a) through (c) using the first node as the relay node).

The method may involve repeating steps (a) through (d) for additional ones of the transmitters and/or additional pairs of the nodes, until a desired predetermined plurality of time difference of arrival and/or time of flight determinations have been made.

At least one of the first and second nodes in the first pair of nodes may have an unknown location, and the method may also include (e) receiving a second signal directly from the first transmitter at the second node of the first pair of nodes, (f) receiving the second signal relayed from the first node of the first pair of nodes at the second node, and (g) determining the delay at the second node between the direct second signal and the relayed second signal by comparing the direct and relayed second signals. Determining at least one of the time difference of arrival and time of flight between the first and second nodes of the first node pair may involve determining the time difference of arrival and time of flight between the first and second nodes using the delay at the first node and the delay at the second node. Steps (a) through (g) may be repeated for one or more additional ones of the transmitters and/or one or more additional pairs of the nodes having at least one node of unknown position, and/or steps (a) through (d) may be repeated for one or more additional pairs of the nodes having known positions, and time of flight may be determined between the one or more additional pairs of the nodes having known positions based on their known positions, until sufficient time difference of arrival and time of flight determinations have been made to determine a position of a desired node and/or transmitter.

Positions of the first and second nodes may be known, and the method may include determining time of flight between the first and second nodes based on their known positions, where determining at least one of the time difference of arrival and time of flight between the first and second nodes of the first node pair involves determining the time difference of arrival between the first and second nodes using the delay at the first node and the determined time of flight between the first and second nodes. The method may involve repeating steps (a) through (d) for one or more additional pairs of the nodes having known positions and determining time of flight between the one or more additional pairs of the nodes having known positions based on their known positions, and/or repeating for one or more additional pairs of the nodes having at least one node of unknown position steps (a) through (d) and further steps of (e) receiving a second signal directly from the first transmitter at the second node of the first pair of nodes, (f) receiving the second signal relayed from the first node of the first pair of nodes at the second node, (g) determining the delay at the second node between the direct second signal and the relayed second signal by comparing the direct and relayed second signals, and (h) determining the time difference of arrival and time of flight between the first and second nodes using the delay at the first node and the delay at the second node, until sufficient time difference of arrival and time of flight determinations have been made to determine a position of a desired node and/or transmitter.

The first transmitter may be a source of acoustic energy or non-RF electromagnetic energy. Each of the nodes may be configured to multiplex three transceiver functions: receiving a signal directly from one of the transmitters, transmitting a relay of the signal received directly from the one transmitter to one or more other nodes, and receiving from others of the nodes one or more relays of the signal received directly from the one transmitter by the others of the nodes.

The method may include relaying the first signal from the second node of the first pair of nodes to the first node and relaying the second signal from the first node of the first pair of nodes to the second node. Relaying the first signal from the second node of the first pair of nodes may include relaying the first signal from the second node to all other nodes in the network and relaying the second signal from the first node of the first pair of nodes may include relaying the second signal from the first node to all other nodes in the network, and each of the first and second nodes of the first pair of nodes may relay only when no other nodes in the network are relaying, each node in the network relaying alternatively. Relaying the first signal from the second node of the first pair of nodes may include shifting the first signal to a frequency out of the first transmitter's frequency band before relaying to eliminate interference. Relaying the first signal from the second node of the first pair of nodes may include adding deliberate time delay prior to relaying.

The method may include determining the position of N nodes in D dimensions, where positions of the transmitters are known and the number of transmitters Q is greater than or equal to $(N(2D+1-N))/([2(N-1)])$. N may be at least four, D three, and Q only two. The one or more transmitters may consist of at least three transmitters with known three-dimensional locations and the nodes may include a single node having a known location, and the method may include determining the three-dimensional location of all other nodes in the network.

The one or more transmitters may consist of at least two transmitters with known two-dimensional locations and the nodes may include a single node having a known location, and the method may include determining the two-dimensional location of all other nodes in the network.

The method may include determining a D-dimensional position of each of the transmitters, wherein the nodes consist of at least D+1 nodes of known location. One of the transmitters may be a radar target passively transmitting a reflected signal. The nodes may include at least four nodes of known location, and the method may include determining a three-dimensional position of all the transmitters. The nodes may include at least three nodes of known location, and the method may include determining a two-dimensional position of all the nodes in the network using the time of flight determinations.

Determining at least one of the time difference of arrival and time of flight between the first and second nodes of the first node pair may involve determining the time of flight between the first and second nodes, and the method may include communicating a state $T_1$ of the first node's clock to the second node, determining a state $T_{12}$ of the second node's clock when the state $T_1$ of the first node's clock is received at the second node, subtracting the determined time of flight between the first node and the second node from $T_{12}$ to determine a state $T_2$ of the second node's clock when the state of the first node's clock was $T_1$, subtracting $T_1$ from $T_2$ to determine an offset between the two nodes' clocks, and applying the offset to synchronize the clocks of the first node and the second node.

The method may include using additional sensor information and/or prior knowledge to increase fidelity of positioning and/or reduce the number of transmitters required for positioning. The additional sensor information may include angle-of-arrival of transmitter signals, velocity and orientation via Inertial Measurement Unit (IMU), incomplete but useable GPS measurements, direction of magnetic north via compass, orientation to celestial objects (e.g. sun, moon, stars) with date/time known, and/or polarization of the sky due to Rayleigh scattering within the atmosphere, and the prior knowledge comprises Geographic Information Systems information, Digital Terrain Elevation Data, Land Cover Land Use information, reconnaissance information, a physical model of node kinematics, transmitter locations and waveforms, a priori rough estimate of location of operation, and/or weather forecasts.

A new asynchronous localization method in a network of nodes and one or more transmitters, including a first pair of nodes and a first transmitter, the position of at least one of the nodes in the first pair of nodes and/or the first transmitter being known, involves, for the first pair of nodes and the first transmitter: (a) receiving a first signal directly from the first transmitter at a first node of the first pair of nodes, (b) receiving the first signal relayed from a second node of the first pair of nodes at the first node, (c) determining the delay at the first node between the direct first signal and the relayed first signal by comparing the direct and relayed first signals, (d) repeating steps (a) through (c) for desired additional pairs of nodes, and one or more of: (e) sending a same message from multiple nodes of the network at different times to a single node, the different times of sending the same message corresponding to determined delays between each of the multiple nodes and the single node, so that each such message arrives at the single node simultaneously, constructively adding together the messages received at the single node to improve fidelity of the message, and (f) receiving a single message at multiple nodes of the network from a single node, applying delays to the received message at each of the multiple nodes corresponding to determined delays between each of the multiple nodes and the single node, to constructively add together the received messages and increase range and/or aggregate throughput of the network.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

FIG. 3 is a diagram illustrating a problem geometry and symbol definitions.

DETAILED DESCRIPTION

Figure 1:
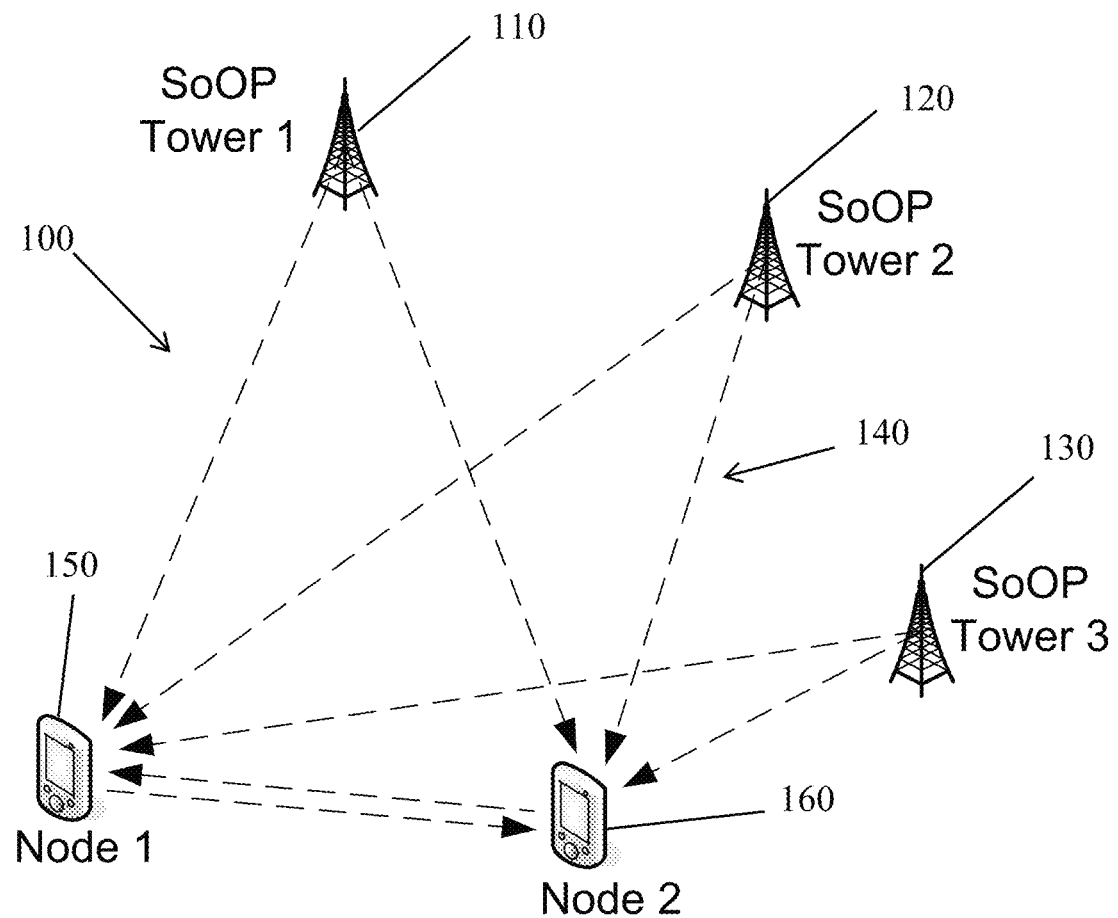
FIG. 1 is a diagram illustrating an LSOP system concept.

A GPS-alternative method to perform asynchronous wireless positioning of networked nodes will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The figures are not to scale. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figures 2A, 2B:
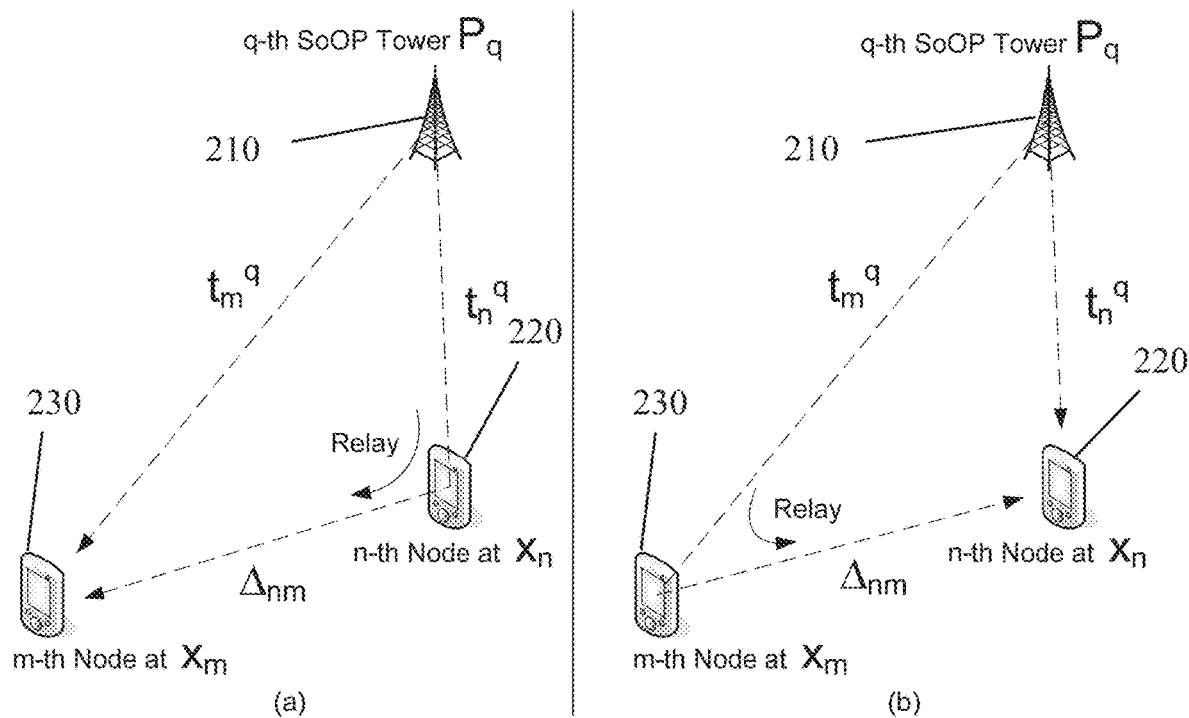
FIGS. 2A-2B are diagrams illustrating an LSOP localization technique using asynchronous nodes.

The concept of using SoOPs from signal sources to localize nodes is illustrated in FIG. 1, which shows a network 100 of three SoOP towers 110, 120, 130 and two nodes 150, 160 transmitting signals 140 between each other. The heart of the LSOP technique is illustrated in FIGS. 2A-B with one SoOP tower 210 and a pair of nodes 220, 230. In FIG. 2A, Node m receives the SoOP signal directly from Tower q while Node n relays the same signal to Node m. The delay between the two received signals is computed at Node m to obtain the TOF difference between the direct and relayed paths. The time-of-flight difference at Node n is measured in likewise fashion as shown in FIG. 2B.

These measurements lead to the following equations:

Delay measured at Node $m$ using SoOP $q$ from FIG. 2A: $d_{nm}^q = (t_n^q + \Delta_{nm}) - t_m^q$ (1)

Delay measured at Node $n$ using SoOP $q$ from FIG. 2A: $d_{nm}^q = (t_m^q + \Delta_{nm}) - t_n^q$ (2)

where $d^q_{nm}$ is delay measured at node m in comparison to node n from SoOP q, $t_n^q$ is the time of flight from SoOP q to node n and $\Delta_{nm}$ is the time of flight from node n to node m.

By subtracting (2) from (1), the TDOA of a signal from the q-th SoOP between Nodes n and m is obtained.

$\tau_{nm}^q := t_n^q - t_m^q = (d_{mn}^q - d_{nm}^q)/2$ (3)

where $\tau_{nm}^q$ is the time difference of arrival between nth and mth nodes from the qth SoOP. By summing equations (1) and (2), the TOF between Nodes n and m is obtained.

$\Delta_{nm} = (d_{nm}^q + d_{mn}^q)/2$ (4)

The TDOA and TOF measurements taken from multiple SoOPs are used with the problem geometry given in FIG. 3 (Q number of SoOP transmitters 310, 320, 330 and two nodes 340, 350 shown) to generate the system of nonlinear equations in (5) and (6). These equations can be used to derive unknown node positions when sufficient SoOPs and/or other nodes are available with known position, or can be used to derive unknown SoOP positions when sufficient nodes are available with known position.

TDOA: $c\tau_{n1}^q = \|x_n - P_q\| - \|x_1 - x_q\|$ (5)

TOF: $c\Delta_{nm} = \|x_n - x_m\|$ (6)

where $x_n$ is the position vector of the nth node, $P_q$ is the position vector of the qth SoOP, and c is the speed of propagation.

Asynchronous Delay Measurement at Nodes

Since the delay between direct and relayed signals is calculated on individual nodes, the measurement technique does not require synchronization between nodes. The nodes do not have to be synchronized as long as their individual clocks are phase-stable during the time difference between the reception of the direct SoOP and the reception of the relayed SoOP so that the delay between these reception events can be precisely measured. This phase-stability requirement is easily met with commercially available clocks since the time difference between reception of direct and relayed SoOPs is sufficiently small such that the clock's error within this duration is negligible.

LSOP Relay Algorithm

Figure 4:
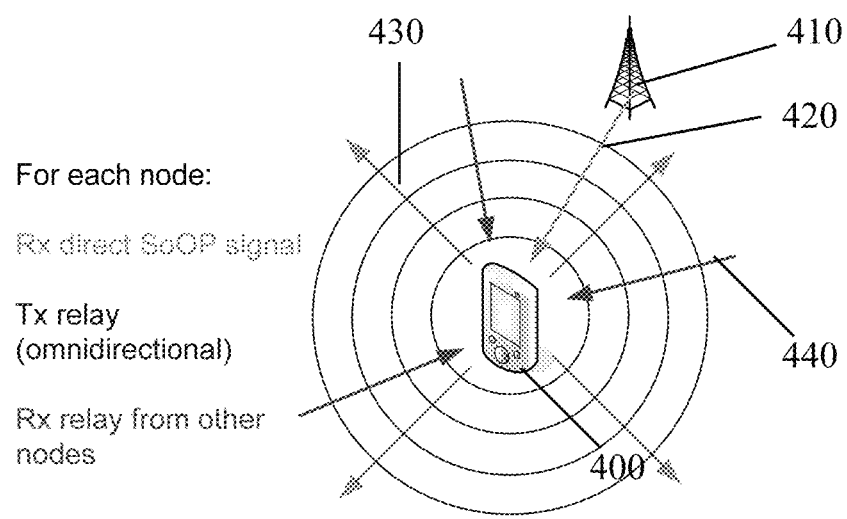
FIG. 4 is a diagram illustrating a node multiplexing receiving a SoOP from a tower, receiving related transmissions from other nodes, and transmitting relay signals omnidirectionally.

A cornerstone of the LSOP technique is the ability to relay SoOP signals across the network of nodes. The time delay between direct and relayed SoOP signals is measured at one node, which allows the TDOA and TOF between nodes to be derived without the need to synchronize timing among the nodes. In embodiments of LSOP each node is capable of multiplexing three transceiver functions: receiving the direct SoOP signal, transmitting the SoOP relay to other nodes, and receiving the SoOP relay from other nodes (see FIG. 4). FIG. 4 shows a node 400 multiplexing receiving a SoOP 420 from tower 410, receiving related transmissions 440 from other noes, and transmitting relay signals 430 omnidirectionally.

The LSOP approach may in some embodiments use a combined time and frequency multiplexing scheme shown in 5A-D. In the technique, all nodes 540, 550, 560 receive the direct SoOP signal (red lines in 5B-D) from SoOP tower 510. Each node 540, 550, 540 takes a turn, at different times, to transmit a SoOP relay signal to the other nodes 570 in the network. The nodes 570 that are receiving the relay compute the time delay between this relay and the direct SoOP signal from SoOP 510. When all nodes have had a chance to relay the SoOP signal, the TDOAs and TOFs can be calculated for the network.

Figures 5A, 5B:
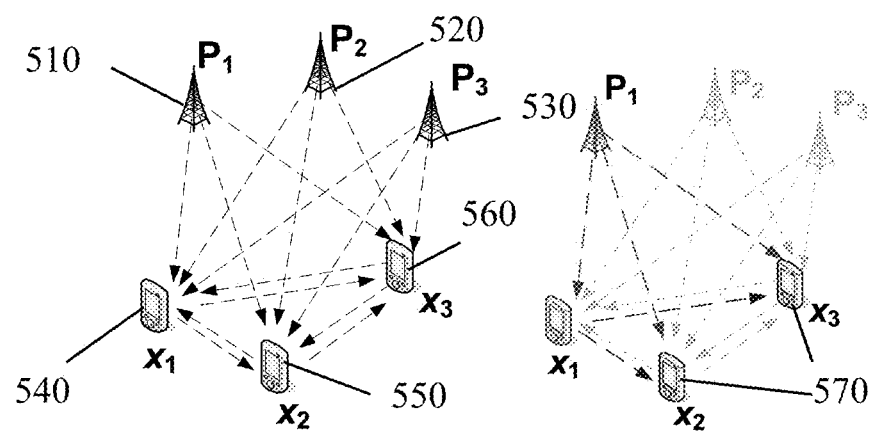
FIGS. 5A-D are diagrams illustrating an LSOP relay multiplexing scheme.
Figures 5C, 5D:
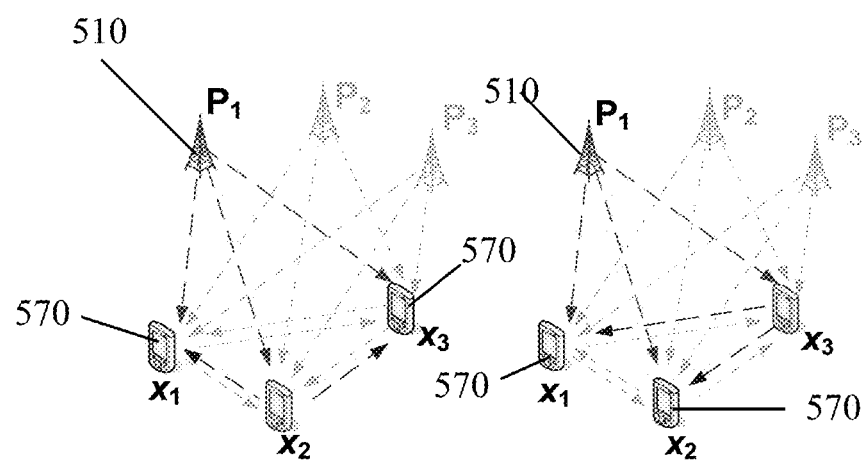

FIG. 5A-D illustrate this process with a 3-node network. In FIG. 5B, at Time 1, Node 1 540 relays the SoOP signal. Nodes 2 and 3 570 simultaneously receive this relay along with the direct SoOP signal, then measure the delay between the signals. FIG. 5C and FIG. 5D repeats this process at Times 2 and 3, for Nodes 2 550 and 3 560, respectively. The delay measurements are then used to compute the TDOAs and TOFs of the Node-SoOP geometry. This entire process is then repeated for each SoOP signal to be used from each SoOP 510, 520, 530 and the system of equations in (5) and (6) can be generated.

In other embodiments, nodes may not take turns transmitting SoOP relay signals. All nodes may relay simultaneously if the relays are multiplexed another way, for example by sending them on different frequencies, if the nodes are spatially separated by enough distance to avoid excessive interference, by sending them on narrow beams, by code multiplexing them, etc. In some embodiments no multiplexing is performed at all and all relays are sent simultaneously on the same frequencies with the same coding, etc. Such an embodiment may be used in applications where interference is not a concern, or with an algorithm that can disambiguate the overlapping relays given enough measurements.

The direct SoOP signal can be shifted to another frequency or delayed in time before being relayed (blue lines in 5B-D) to relay-receiving node pair 570 with different tradeoffs.

A frequency shift places the relay signal out of the SoOP's frequency band to eliminate interference, but requires additional operating bandwidth to accommodate both the direct SoOP and the frequency-shifted relay. At the node that simultaneously receives the direct and relay SoOPs, each may be filtered and then a cross-correlation may be performed on the two signals to get the delay caused by the relay.

A time-delayed relay signal with no frequency shift would not require additional operating bandwidth, but would suffer some signal degradation due to the interfering direct SoOP signal at the same frequency. Deliberate time delay applied before relaying may be beneficial to allow for hardware/software latencies. The node that acts as the relay may capture a time-stamped block of SoOP waveform data at time=Trx. It may then schedule to have this data retransmitted/relayed in the future at time Ttx=Trx+deliberate delay. Here the deliberate delay may be made large enough so that the hardware/software has enough time to execute the transmit command before the actual time reaches Ttx.

When implementing the relay with deliberate delay, which may be on the order of milliseconds, both direct and relay SoOPs can be set on the same carrier frequency. The receiver node then receives both direct and relay on the same frequency and so no filtering is required. Delay due to the relay (i.e. not deliberate delay) may be reliably measured by auto-correlating the received signal with itself, as opposed to cross-correlating the two signals in the frequency-shifting case.

Other embodiments may use various other multiplexing schemes.

Eight applications of the asynchronous delay measurement technique are discussed below:
App 1: Locate nodes using SoOPs in known positions
App 2: Locate nodes using SoOPs in known positions and at least one node position known
App 3: Locate SoOPs using nodes in known positions
App 4: Locate nodes using other nodes in known positions
App 5: Passive or Semi-Active Multistatic Radar Using LSOP
App 6: Knowledge-Based Positioning
App 7: Signal Reinforcement via Constructive Integration
App 8: Remote Clock Synchronization
App 1: Locate Nodes Using SoOPs in Known Positions This application deals with the general problem of positioning nodes using a sufficient number of SoOPs in known positions. Inspecting equations (5) and (6) it can be seen that $Q*N$ independent TDOA equations are generated with Q number of SoOPs and N number of nodes. Likewise, it can be seen that $N*(N-1)/2$ TOF equations are generated, but possibly some or none are dependent. To solve for the positions of N nodes in D dimensions ($D*N$ unknowns) requires $D*N$ independent equations. Our requirement is setup as follows:

# of equations ≥ # of unknowns # of TDOA equations + # of TOF equations ≥ # of unknowns $$Q(N-1)+N(N-1)/2 \geq DN \Rightarrow Q \geq N(2D+1-N)/[2(N-1)] \quad (7)$$

This gives the theoretical number of SoOPs, Q, required to position N number of nodes in D dimensions assuming all generated equations are independent. To position a minimum number of nodes in 3 dimensions, D=3, N=2 and equation (7) gives Q>=5 as the required number of SoOPs. It can be seen that if $N \geq 7$, Q will be $\leq 0$. This seems to imply that with 7 nodes, no SoOPs are required to position the nodes, i.e. the nodes can position themselves. This turns out to be false since the system of equations becomes dependent at this point and equation (7) is no longer valid. In fact, analysis has shown that the system of equations is dependent even when D=3, N=6 and Q=1, which suggests that it is not possible to use only a single SoOP to position nodes in 3 dimensions using the technique. Similar analysis indicates that 3-D positioning can theoretically be performed with a minimum of 2 SoOPs when at least 4 nodes are involved in the measurement technique. To alleviate the deleterious effects of noise, more than the required amount of SoOPs and nodes are generally used in practice.

App 2: Locate Nodes Using SoOPs in Known Positions and at Least One Node Position Known When at least one node's position is known, the system of equations in (5) and (6) simplifies from a nonlinear system to a linear one and the breadth of linear algebra may be applied in analyzing and efficiently solving the system. The derivation follows.

Let one of the known node positions be labeled $x_1$ and set as the origin, $x_1=[0\ 0\ 0]^T$. Then all other node and SoOP positions in the following are defined relative to this known point. Using equations (1) and (2) and substituting in $x_1$ yields,

TDOA:

$$c\tau_{n1}{}^q = (\|x_n - P_q\| - \|x_1 - P_q\|)_{x_1=0} = \|x_n - P_q\| - \|P_q\| \Rightarrow \|x_n - P_q\|^2 = (c\tau_{n1}{}^q + \|P_q\|)^2 \quad (8)$$

TOF:

$$c\Delta_{n1} = (\|x_n - x_1\|)_{x_1=0} = \|x_n\| \Rightarrow \|x_n\|^2 = (c\Delta_{n1})^2 \quad (9)$$

The law of cosines, $\|u-v\|^2 = \|u\|^2 + \|v\|^2 - 2v^T u$, can be used on the left hand side of (8)

$$\|x_n\|^2 + \|P_q\|^2 - 2P_q^T x_n = (c\tau_{n1}{}^q + \|P_q\|)^2 \quad (10)$$

and using (9) in (10) gives $$P_q^T x_n = b_{qn}, \text{ for SoOPs } q=1 \ldots Q \text{ and Nodes } n=2 \ldots N \quad (11)$$

where $b_{qn} := [(c\Delta_{n1})^2 + \|P_q\|^2 - (c\tau_{n1}^q + \|P_q\|)^2]/2$
which is linear in the unknown node positions, $x_n$.

Inspection of the dimensions of the linear system gives the constraints on the number of known SoOP locations required to perform localization. Here P is a Q×3 matrix so Q≥3 SoOPs are required to generate a sufficient number of equations in each linear system to solve for the unknown Node position. In practice, it is normally required to use Q>3 SoOPs to alleviate the effects of noise.

$$x_1 = 0, \text{ a known node location is set as origin} \quad (12)$$

$$P_q^T x_n = [(c\Delta_{n1})^2 + \|P_q\|^2 - (c\tau_{n1}^q + \|P_q\|)^2]/2 \equiv b_{qn},$$

$$n = 2 \ldots N$$

$$Q \geq M$$

$$Q \geq 3 \text{ for 3-D positioning}$$

App 3: Locate SoOPs Using Nodes in Known Positions

In this case, only the TDOA measurements are used since the TOF measurements do not contain range information about the SoOPs. This case is equivalent to multilateration, but can compute the TDOAs asynchronously. A minimum of 4 nodes are required to perform 3-D LSOP on any number of SoOPs with unknown location. In practice, it is normally required to use greater than 4 nodes to alleviate the effects of noise.

$$c\tau_{n1}^q = \|x_n - P_q\| - \|x_1 - P_q\| \quad (13)$$

$$\text{\# TDOA eq's} \geq \text{\# unknowns}$$

$$Q(N-1) \geq QM$$

$$N \geq M + 1$$

$$N \geq 4 \text{ for 3-D positioning}$$

Figure 6:
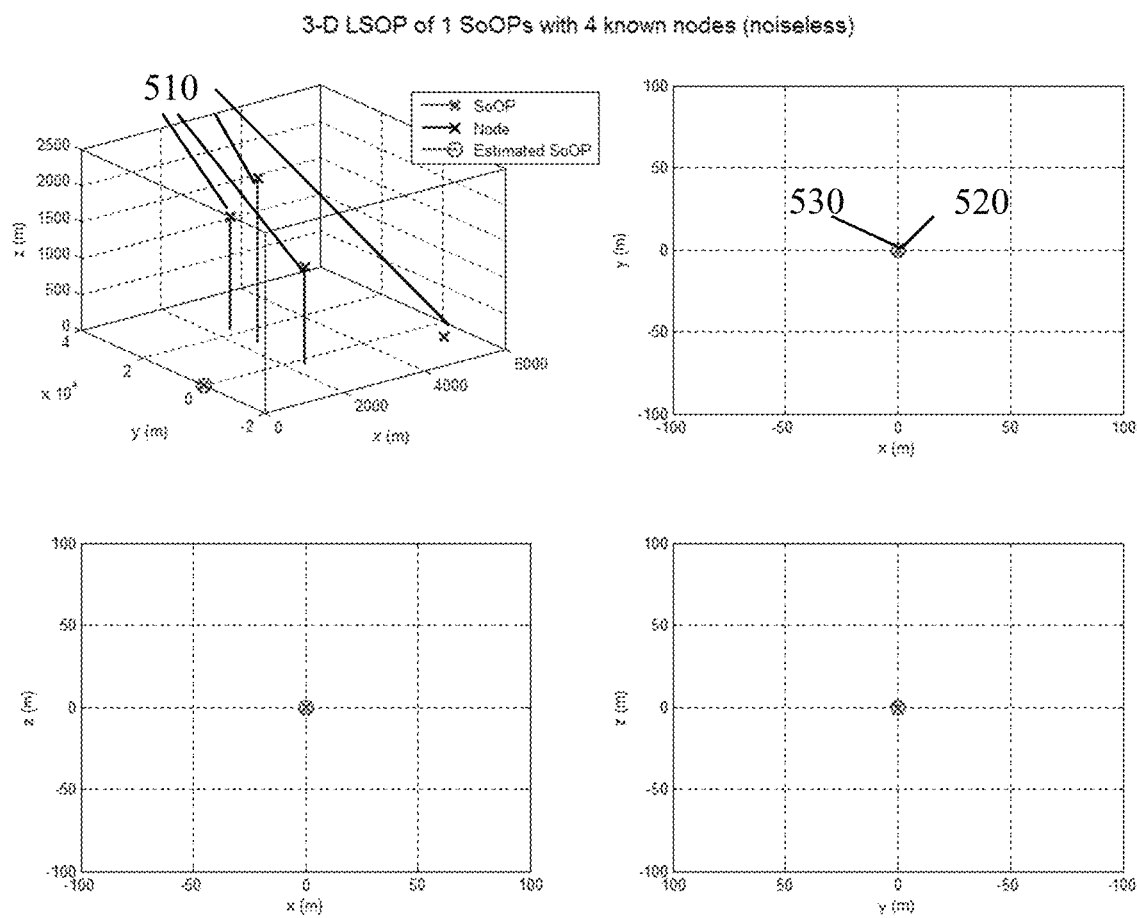
FIG. 6 illustrates Case 3 LSOP of 1 SoOP using 4 Nodes with known position and noiseless TDOA/TOF data.

FIG. 6 shows a noiseless case of localizing one SoOP 530 in 3-D using four nodes 510. This verifies the theoretical results in equation (13) where a SoOP can be localized using four nodes with known location. Estimated SoOP 520 overlaps with actual SoOP position 530.

App 4: Locate Nodes Using Other Nodes in Known Positions

When a sufficient number of nodes have known position, it is possible to localize other nodes without the use of SoOPs. In this case, only the TOF measurements are used in the analysis. If TDOA information is used in addition to TOF, the equations will be equivalent to App 2 with 1 known node set at the origin and the other known nodes acting as SoOPs. When using TOF data alone, the algorithm simplifies to solving a linear system of equations. The derivation follows.

Let $x_n$, n=1 ... N be the N known node positions and $u_k$, k=1 ... K be the K unknown node positions. The set of TOF equations are given by:

$$TOF: c\Delta_{uk} = \|x_n - u_k\|, \, n=1 \ldots N, \, k=1 \ldots K \quad (14)$$

Set $x_1$ to the origin, then $$c\Delta_{1k} = (\|x_1 - u_k\|)|_{x_1=0} = \|u_k\| \Rightarrow (c\Delta_{1k})^2 = \|u_k\|^2 \quad (15)$$

By squaring (14) using the law of cosines, $\|v-w\|^2 = \|v\|^2 + \|w\|^2 - 2v^T w$, and substituting in (15) the expression in (14) becomes $$(c\Delta_{nk})^2 = \|x_n\|^2 + \|u_k\|^2 - 2x_n^T u_k = \|x_n\|^2 + (c\Delta_{1k})^2 - 2x_n^T u_k$$

$x_n^T u_k = b_{nk}$, for known nodes n=1 ... N and unknown nodes k=1 ... K, $$\text{where } b_{nk} := [\|x_n\|^2 + (c\Delta_{1k})^2 - (c\Delta_{nk})^2]/2 \quad (16)$$

which is linear in the unknown node positions, $u_k$. Inspection of the dimensions of the linear system gives the constraint on the number of known node locations required to localize the unknown nodes using TOF data. A minimum of 4 nodes with known locations are required to perform 3-D LSOP on any number of nodes with unknown location. In practice, it is normally required to use greater than 4 nodes with known position to alleviate the effects of noise.

$$x_1 = 0, \text{ a known node location is set as origin} \quad (17)$$

$$x_q^T u_k = [\|x_n\|^2 + (c\Delta_{1k})^2 - (c\Delta_{nk})^2]/2 \equiv b_{nk}, n = 2 \ldots N,$$

$$k = 1 \ldots K$$

$$N - 1 \geq M$$

$$Q \geq M + 1$$

$$N \geq 4 \text{ for 3-D positioning}$$

App 5: Passive or Semi-Active Multistatic Radar Using LSOP

Figure 7:
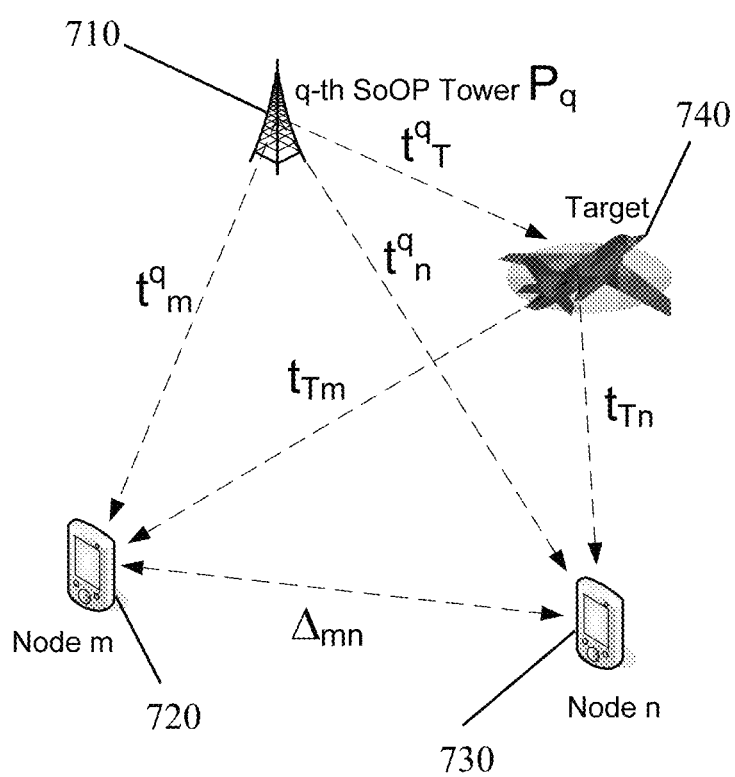
FIG. 7 is a diagram illustrating the use of LSOP for multistatic radar.

FIG. 7 is a diagram illustrating the use of LSOP for a passive or semi-active multistatic radar. At least one SoOP 710 with known or unknown location transmits a signal that is reflected off of a target 740 and is received by a set of nodes 720, 730. Comparing this diagram to that shown in FIG. 2, the target 740 can be viewed as the SoOP 210 in FIG. 2. This situation is equivalent to App 3: Locate SoOPs using nodes in known positions, where the target 740 would be considered the SoOP. Therefore, M+1 nodes 720, 730 are required to locate the target 740 in M dimensions. If more SoOPs are used, redundant measurements can be taken and used to alleviate the effects of noise in the measurements. If multiple SoOPs 710 with known positions are used, it may increase the fidelity of the positioning and/or reduce the number of nodes 720, 730 required to position the target 740.

App 6: Knowledge-Based Positioning

Figure 8:
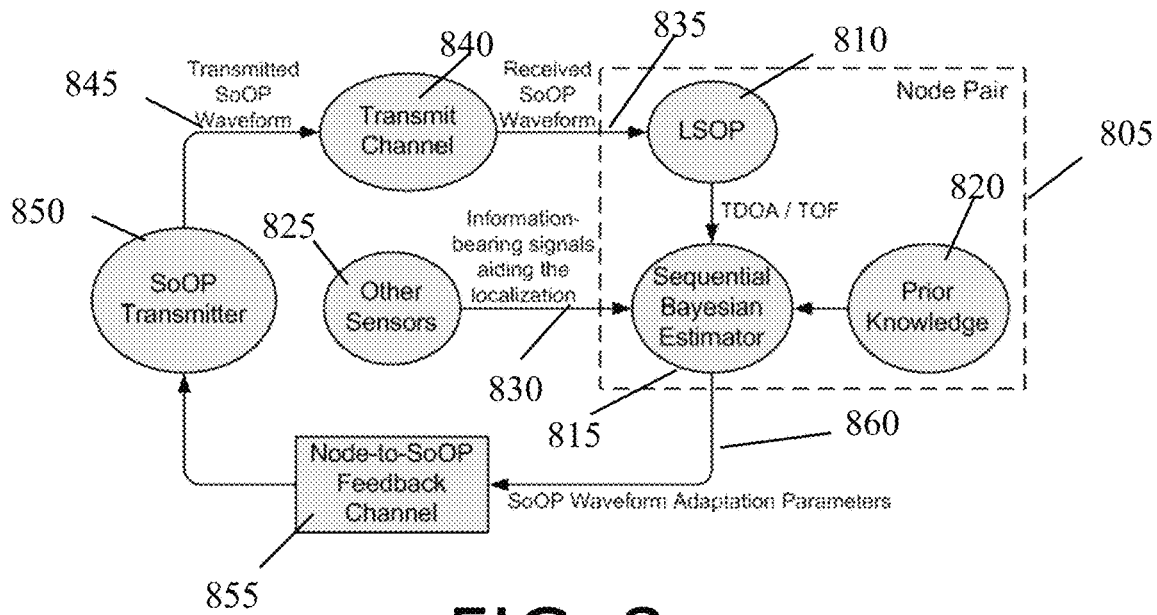
FIG. 8 is a diagram illustrating a knowledge-based LSOP architecture.

LSOP may be extended to a scalable, adaptive architecture where any additional sensors and any available prior information can be included to enhance the positioning performance. FIG. 8 is a diagram illustrating a knowledge-based LSOP architecture. The architecture in FIG. 8 borrows concepts from the Knowledge Based (KB) Radar model and is coined KB-LSOP. The key goal of the KB paradigm is to increase the fidelity of the system's output by exploiting all available information in an adaptive manner as the operating environment varies and as information becomes available. LSOP 810 determines TDOA and TOF using the received SoOP waveform 835 from the transmitted SoOP waveform 845 sent by the SoOP transmitter 850 through the transmit channel 840. Sequential Bayesian Estimator (SBE) 815 incorporates TDOA and TOF determinations from LSOP 810, prior knowledge 820, and information-bearing signals 830 from other sensors 825 to produce the most likely position estimates based on this data. If the SoOP is controllable by the node pair 805, the SBE 815 can also incorporate this data to produce SoOP waveform adaptation parameters 860 which are transmitted through the node-to-SoOP feedback channel 855 to the SoOP transmitter 850.

The KB-LSOP architecture consists of the knowledge base containing all available information about the problem at hand (e.g. TDOA/TOF measurements received from LSOP 810, measurements 830 from other sensors, other prior information 820, transmit channel information, etc.), and the inference engine 815 that makes decisions based on the knowledge base. In FIG. 8 the knowledge base includes information about the wireless transmit channel, measurements from LSOP and other sensors, and prior knowledge. Information about the transmit channel (i.e. channel state information) contains the known or measured effects of the channel on the SoOP signal as it propagates to the LSOP nodes. For instance, this information can be used to mitigate the effects of multipath fading on the delay measurement made by LSOP. In cases where the SoOP is controllable by the system designer, the node-to-SoOP feedback in the diagram gives the option to pass information to the transmitters, enabling adaptive SoOP waveforms to further combat the channel effects.

The LSOP measurements may be used to localize an arbitrary number of nodes assuming a sufficient number of SoOPs are available. With additional sensor inputs, LSOP is enhanced with higher fidelity and/or by requiring less SoOPs. Examples of additional sensor information that can aid localization include: angle-of-arrival of SoOPs (enabling triangulation), velocity and orientation via Inertial Measurement Unit (IMU), incomplete but useable GPS measurements, direction of magnetic north via compass, orientation to celestial objects (e.g. sun, moon, stars) with date/time known, polarization of the sky due to Rayleigh scattering within the atmosphere, etc.

Prior knowledge 820 includes any information known about the operating scenario at hand that can augment the localization. Examples include Geographic Information Systems (GIS), Digital Terrain Elevation Data (DTED), Land Cover Land Use (LCLU) information, reconnaissance information, a physical model of LSOP node kinematics, SoOP locations and waveforms, a priori rough estimate of location of operation, weather forecasts, etc. The prior knowledge 820 may be used adaptively since different sets of information are utilized as operating conditions vary. For example, in one scenario the positioning sensors coupled with LCLU data have determined that the nodes have exited dense urban terrain and entered a valley area. To enhance the positioning, the algorithms switch multipath mitigation strategies and DTED of the valley may be used to aid in elevation positioning.

The inference engine is the Sequential Bayesian Estimator (SBE) 815, which fuses current measurements (from LSOP 810 and other sensors 825) with all prior information 820 (prior knowledge and prior measurements) to give a statistically-best estimate of the node positions. The SBE can be derived using a state-space representation of the problem, $$x(t) = A_t(x(t-1), u(t-1), w(t-1))$$

$$y(t) = C_t(x(t), u(t), v(t)) \quad (18)$$

where $x(t)$ is the vector of the hidden states to be estimated (node locations, velocities, etc.) at current time t, $y(t)$ is the vector of available measurements (TDOA, TOF, IMU data, etc.) at current time t, $A_t(\bullet)$ is the dynamic state transition function (modeled using node kinematics), $C_t(\bullet)$ is the measurement function (modeled using equations (1) and (2), and likewise for other sensors), $u(t)$ is the control input at current time t (e.g. when nodes are on vehicles and if the control input is available), $v(t)$ is the sensor measurement noise at current time t, and $w(t-1)$ is the uncertainty of the state transition model at the previous time step t-1. Several assumptions and Bayes' theorem are applied to equation (18) to produce the Sequential (recursive) Bayesian Estimator of the current state, $x(t)$, given the entire history of measurements, $Y_t\{y(0), \ldots, y(t)\}$:

Prediction: $Pr(x(t)|Y_{t-1}) = \int Pr(x(t)|x(t-1)) \times Pr(x(t-1)|Y_{t-1}) dx(t-1)$ Update: $Pr(x(t)|Y_t) = [Pr(y(t)|x(t))/Pr(y(t)|Y_{t-1})] Pr(x(t)|Y_{t-1})$ Initial State: $\bar{x}(0)$ Initial State Covariance: $\bar{P}(0)$ Initial Filtered Conditional: $Pr(x(0)|Y_0)$ (19)

The result in the update equation, $Pr(x(t)|Y_t)$, is the probability density function (pdf) of the current state estimate given all measurements made up to the current time. This pdf, also known as the posterior pdf, can be used to compute relevant statistical measures, such as the mean and covariance, that can be used to obtain and qualify an estimate of the current state (node positions, velocities, etc.).

It can be seen that the state-space/Bayesian framework is well suited to the data fusion required by the KB architecture. The pdf of the state transition, $Pr(x(t)|x(t-1))$, is specified both by the node kinematics modeled in $A_t(\bullet)$, and by the confidence in this model quantified by $Pr(w(t-1))$. The likelihood pdf, $Pr(y(t)|x(t))$, incorporates the measurements from all available sensor outputs, their relationship to the state $(x(t))$ and control inputs $(u(t))$ via $C_t(\bullet)$, and confidence in these measurements through $v(t)$. Additionally, all prior measurements up to the current time are embedded in $Y_t$ and used to estimate the current state, $x(t)$. It should also be noted that since the SBE 815 is recursive, every quantity in the prediction and update equations are generally time-dependent, and so can be adapted as operating conditions change. It is through the adaptive capability that prior information may be inserted into the processing at any time step.

The inherent adaptive capability afforded by the Sequential Bayesian framework also produces a scalable architecture. The resources of the architecture (hardware/software, sensors, prior knowledge) may be scaled to whatever level is required or is available to meet the desired size, weight and power (SWAP), cost, and accuracy constraints defined by the operational scenario.

App 7: Signal Reinforcement by Constructive Integration

The technique enables signal reinforcement in a network of devices. In the signal transmission case, multiple network members can transmit the same message to a recipient with various delays. These delays are set according to the transmitters' distance from the recipient such that the multiple copies of the message arrive at the recipient nearly simultaneously so they can be constructively integrated together to produce a higher fidelity signal. This also holds in the reciprocal case of signal reception where multiple receivers/sensors can sense the same signal from a single transmitter/source and apply specific delays to achieve constructive integration. The technique is used to determine the appropriate delays to be applied at the transmitters or receivers to enable the constructive signal reinforcement. This approach is especially useful when the locations of the members of the network are unknown or when the network members are moving because the signal reinforcement can be achieved without knowledge of the positions of the network members or without having to solve for the positions of the network members.

The signal reinforcement can be used to increase the range and/or the aggregate throughput of networked communications or networked sensing devices. The signal reinforcement also enables asynchronous, non-coherent direction finding to be performed.

App 8: Remote Clock Synchronization

When the range or, equivalently, the TOF between a pair of devices is known their clocks can be synchronized. Assume at time $t_0$ device 1's clock is set to time $T_1=t_0+dt_1$ and device 2's clock is set to time $T_2=t_0+dt_2$. Then the offset between clocks is $dT_{12}=dt_2-dt_1$. If at time $t_0$ device 1 communicates the state of its clock, $T_1$, to device 2, then device 2 will receive device 1's clock state at time $T_{12}=T_2+TOF_{12}$, where $TOF_{12}$ is the TOF between device 1 and 2. Since device 1 sent its clock state, $T_1$, at the time of transmission, and device 2 knows when it received the transmission, $T_{12}$, device 2 can compute the clock offset between the 2 devices, $dT_{21}$, if the TOF between devices is known:

$$T_{12}-T_1=T_2+TOF_{12}-T_1=t_0+dt_2+TOF_{12}-t_0-dt_1=dT_{21}+TOF_{12} \quad (20)$$

This clock offset can be used to compensate the time on one of the device clocks so that both clocks are set to the same time. The technique enables remote clock synchronization because the technique inherently measures the TOF between nodes. The technique can measure the TOF between nodes using only a single SoOP without requiring knowledge of the SoOP's position. Using additional SoOPs will generate redundant TOF measurements where all TOF measurements can be combined together to alleviate noise in the measurements. Since the SoOP position does not need to be known, one of the nodes in the pair of nodes performing the technique can simultaneously act as the SoOP transmitter and node. Performing the technique, the SoOP node will transmit a signal to the second node and the second node will relay it back to the SoOP node. The SoOP node then computes the delay between what it sent and the relayed signal. This delay is the round trip time of flight which can be used to compute the TOF between nodes.

Implementation of Technique and Field Test on COTS Platform

Figure 9:
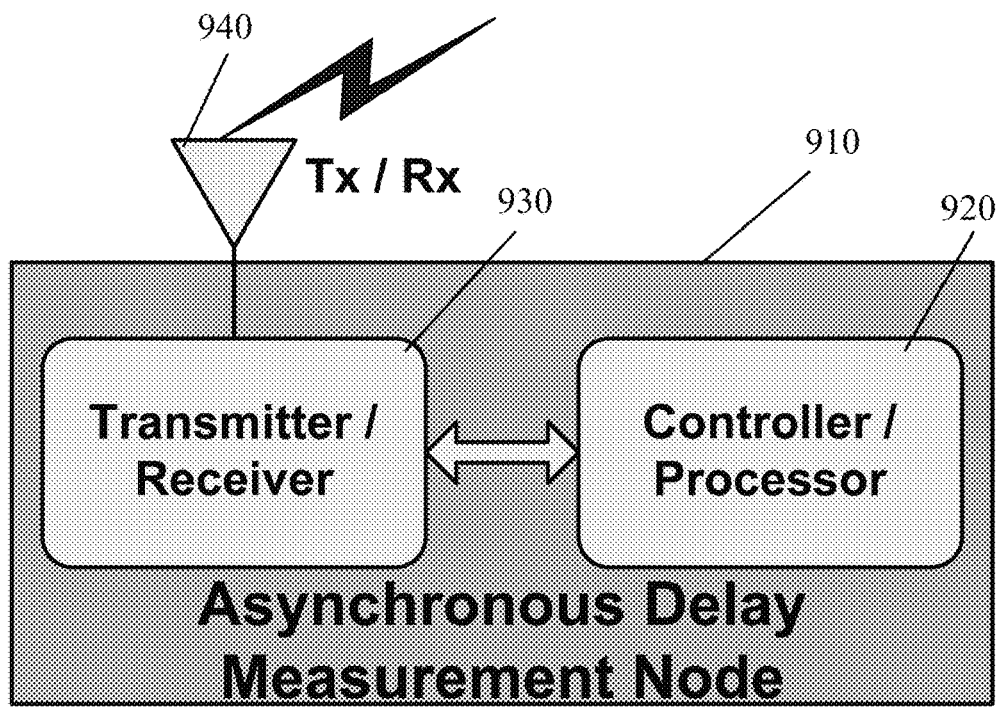
FIG. 9 is a diagram of an Asynchronous Delay Measurement (ADM) node.

The technique can be implemented on at least two Asynchronous Delay Measurement (ADM) nodes 910 each realized by a general purpose transceiver device that has control and processing capabilities, see FIG. 9. The transceiver receives the SoOP signal 940 and transmits the relay required by the technique. The Controller/Processor 920 configures and provides high-level control of the transceiver 930, and processes the received direct and relay waveforms to compute the delays in equations (1) and (2). Depending on the platform type, the technique can be implemented in hardware-only, software-only, or a combination of both.

Figure 10:
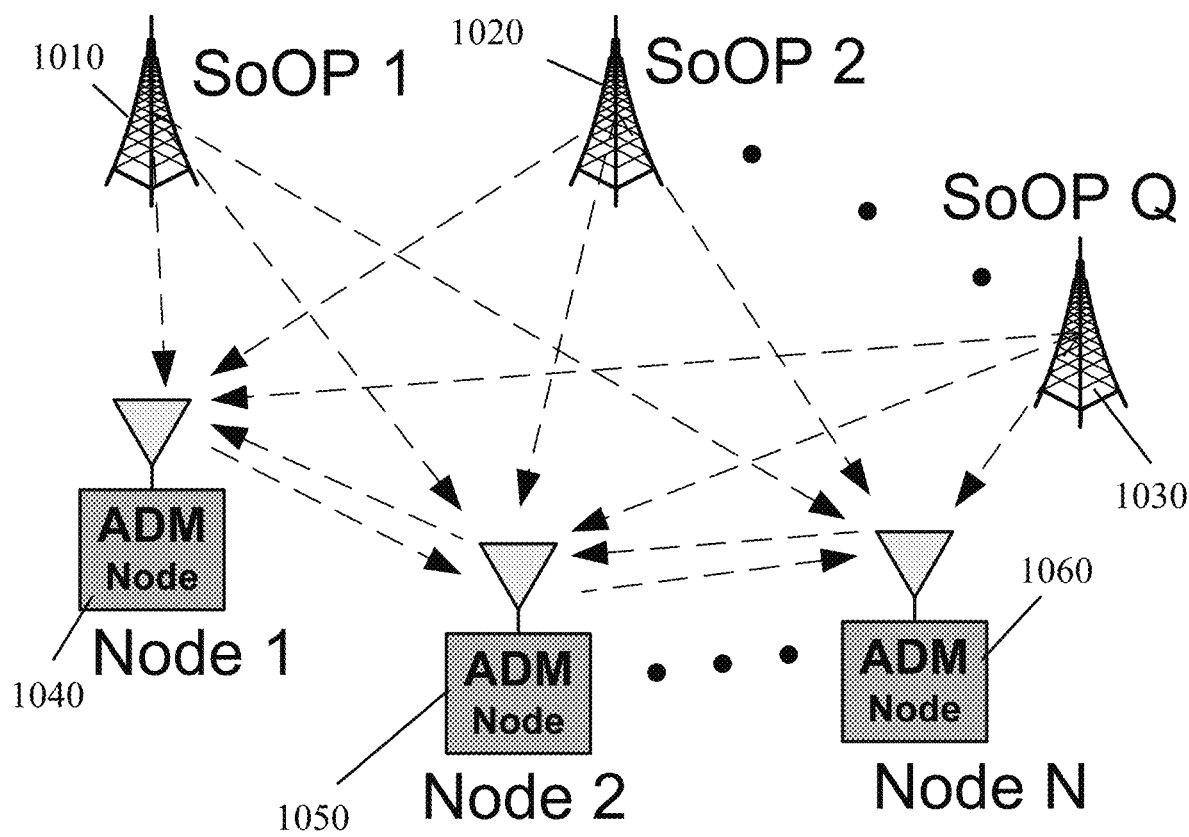
FIG. 10 is a network of ADM nodes and SoOPs.

A network of two or more ADM nodes 1040, 1050, 1060 are required to perform the technique, and, depending on application, zero or more SoOPs 1010, 1020, 1030 are required, as illustrated in FIG. 10.

Figure 11:
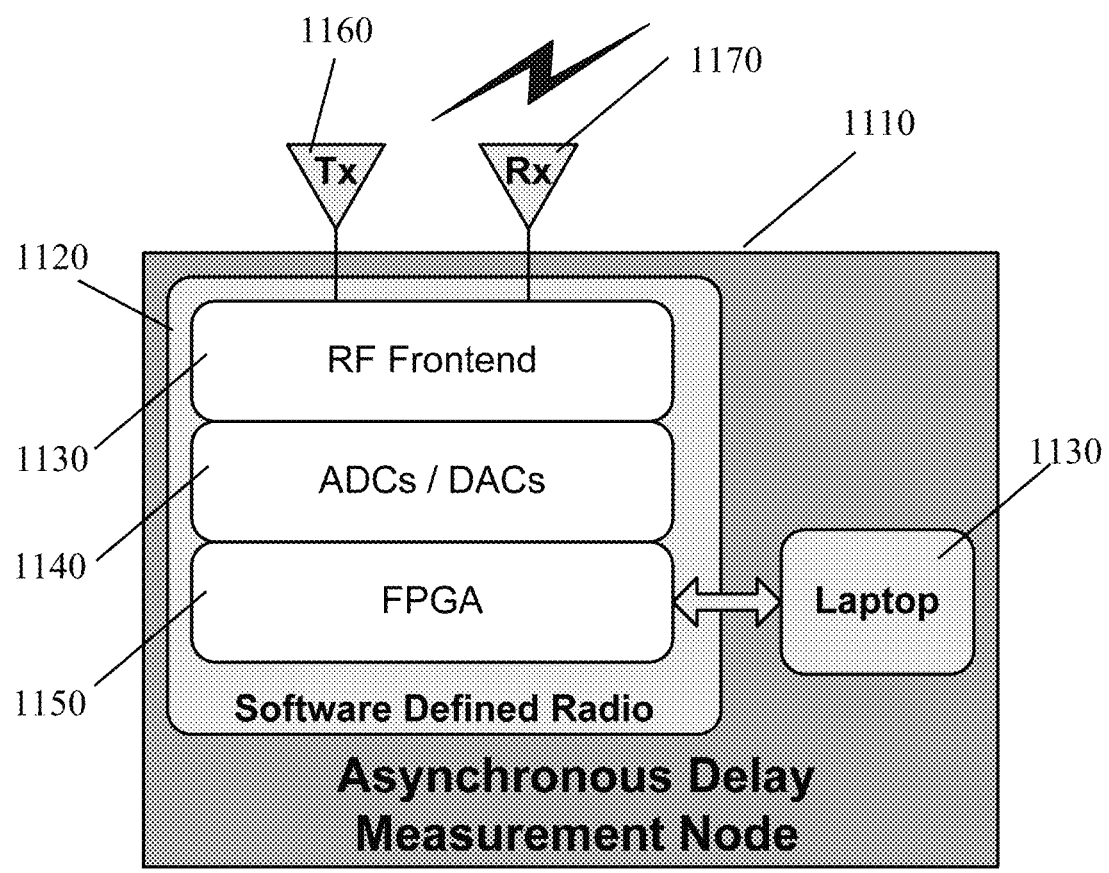
FIG. 11 is a diagram of an ADM node implemented on a software defined radio (SDR) platform.
Figure 12:
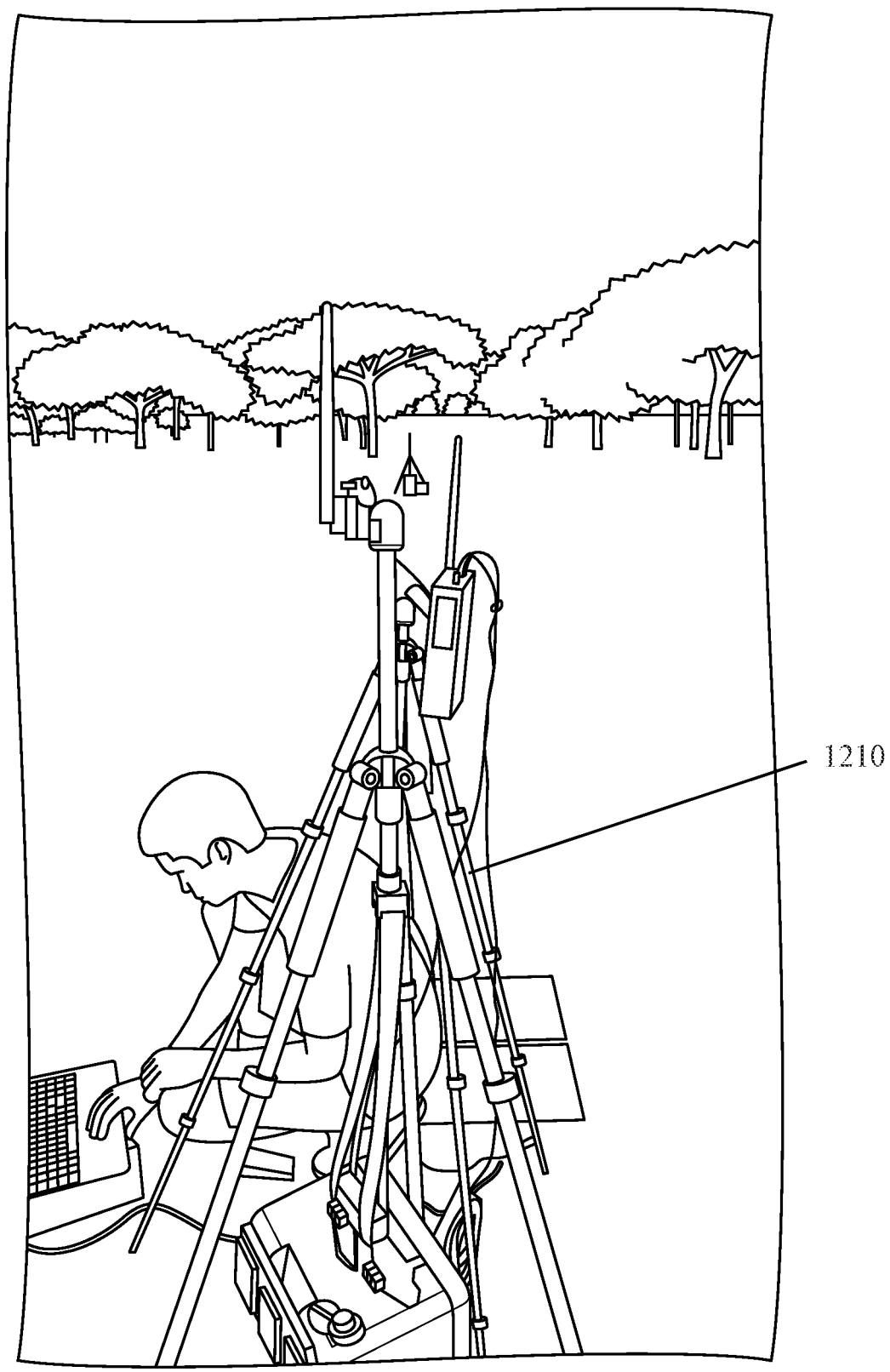
FIG. 12 is a photograph of LSOP Node 1 that is being positioned.
Figure 13:
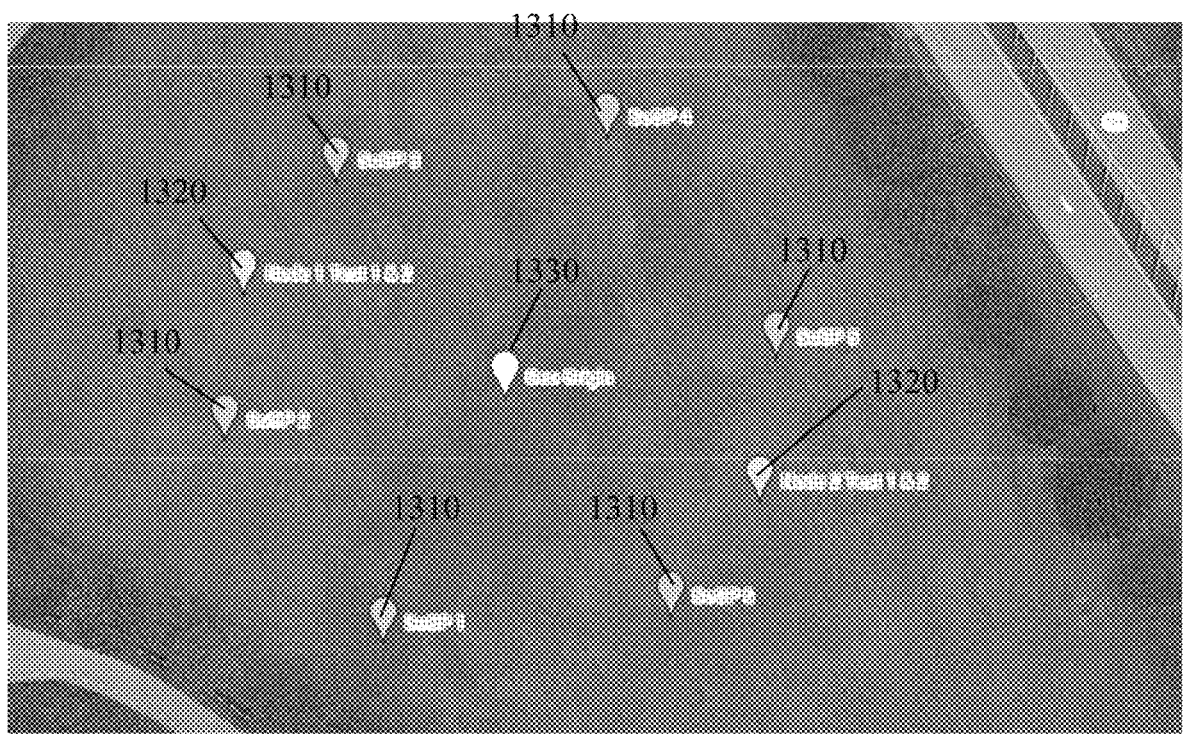
FIG. 13 is a known node—SoOP test geometry plot.
Figure 14:
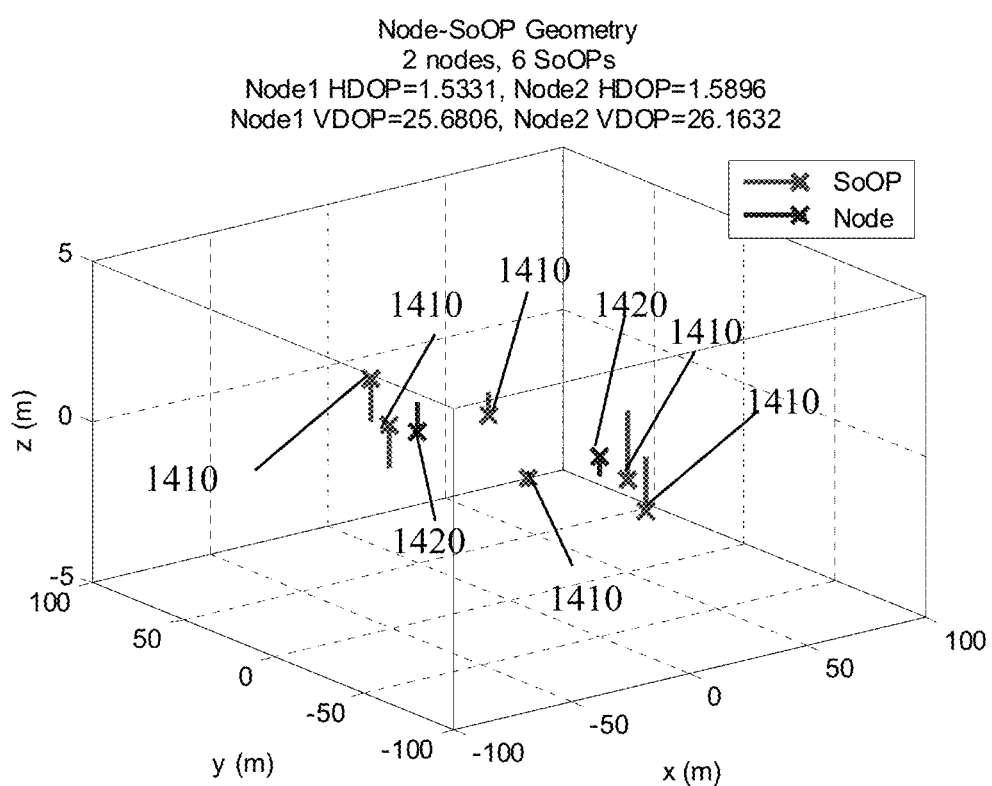
FIG. 14 is a 3-D view of Node-SoOP test geometry.
Figure 15:
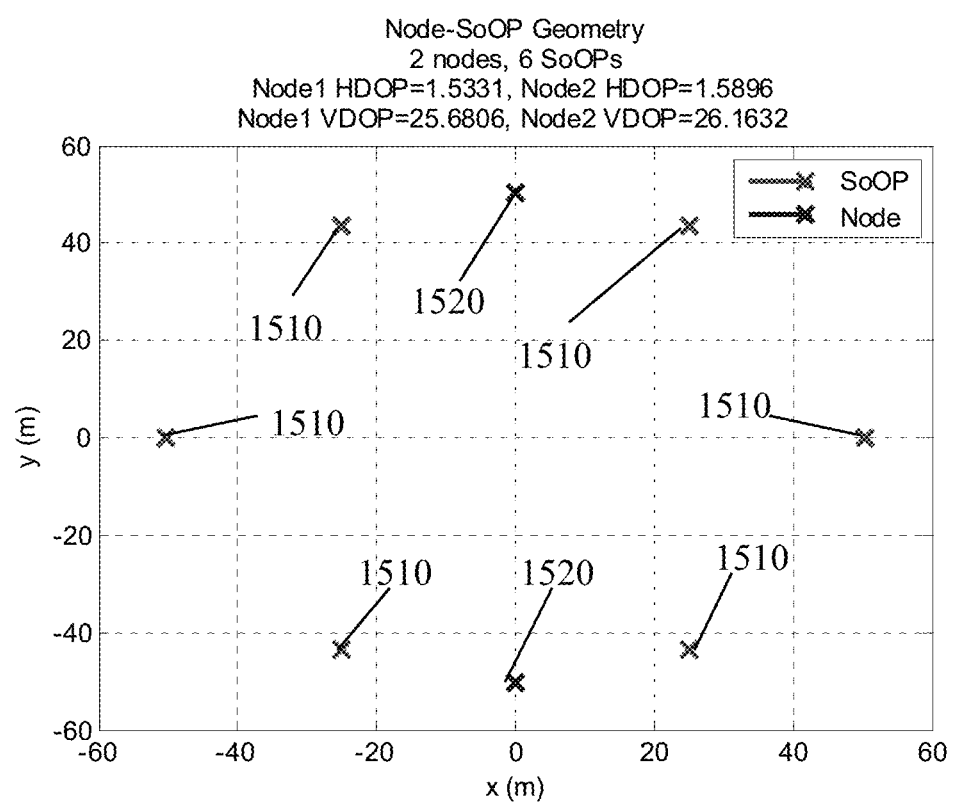
FIG. 15 is an X-Y view of Node-SoOP test geometry.

A field test was conducted using a commercial-off-the-shelf (COTS) software defined radio (SDR) platform. ADM nodes 1110 and synthetic SoOPs were implemented as in FIG. 11 and the field setup 1210 is shown in FIG. 12. ADM node 1110 includes a software defined radio 1120 having RF frontent 1130, ADCs and DACs (analog-to-digital and digital-to-analog converters) 1140, and field-programmable gate array (FPGA) 1150 and laptop 1130 communicating with FPGA 1150 within software defined radio 1120, RF frontend transmitting 1160 and receiving 1170 signals. The SoOPs transmitted a radio frequency signal at a carrier frequency of 842.5 MHz with 8.33 MHz bandwidth. FIG. 13 shows the Node-SoOP test geometry plotted in Google Maps, with six SoOPs 1310, two nodes 1320, and geometry origin 1330 for the center of the location axis. The SoOP circle was ~100 m in diameter. FIG. 14 shows a 3-D plot of the SoOPs 1410 and nodes 1420 and FIG. 15 shows an X-Y view of the test geometry of SoOPs 1510 and nodes 1520. Six SoOPs were used to position two Nodes. Horizontal dilution of precision for the Nodes is approximately 1.6 since there is good horizontal diversity in both SoOPs and Nodes. Vertical dilution of precision is poor since there is low vertical diversity, i.e. SoOPs and Nodes are similar in altitude. Node 1 is at (x, y) ~(0, −50.3 m). Node 2 at (x, y) ~(0, 50.3 m).

Figure 16:
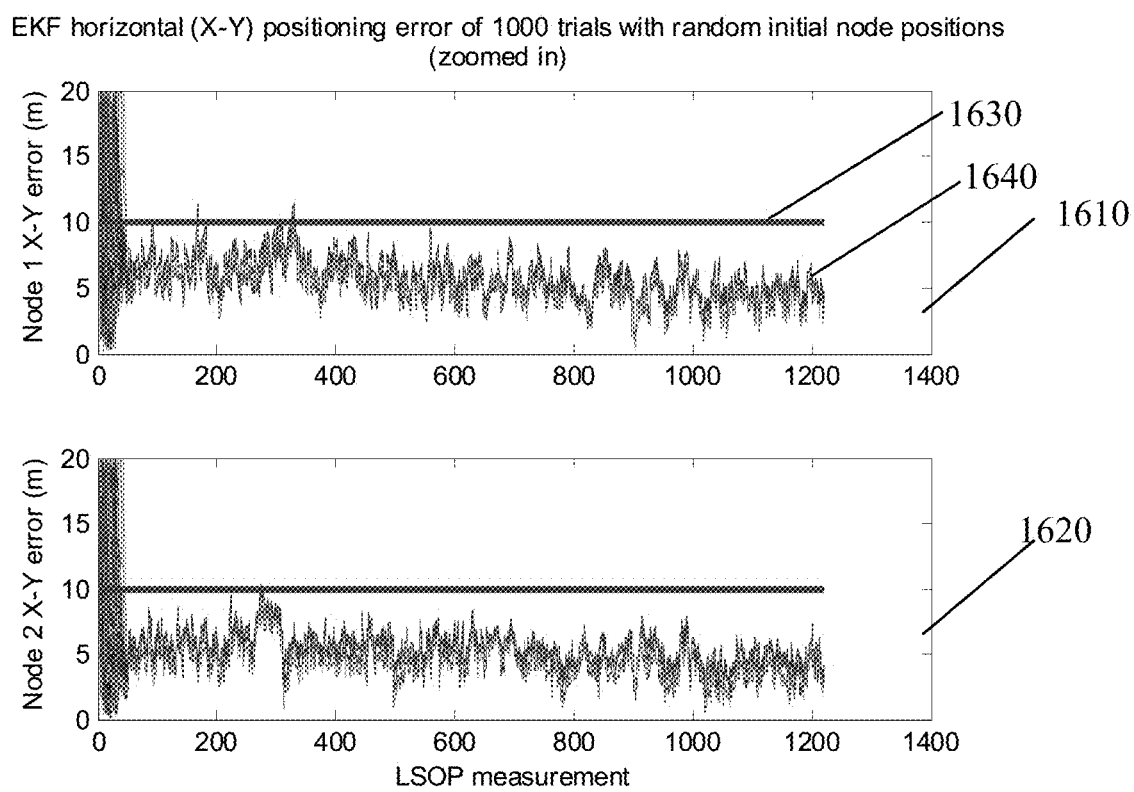
FIG. 16 shows graphs of EKF horizontal positioning error over 1000 trials with random initial node positions.
Figure 17:
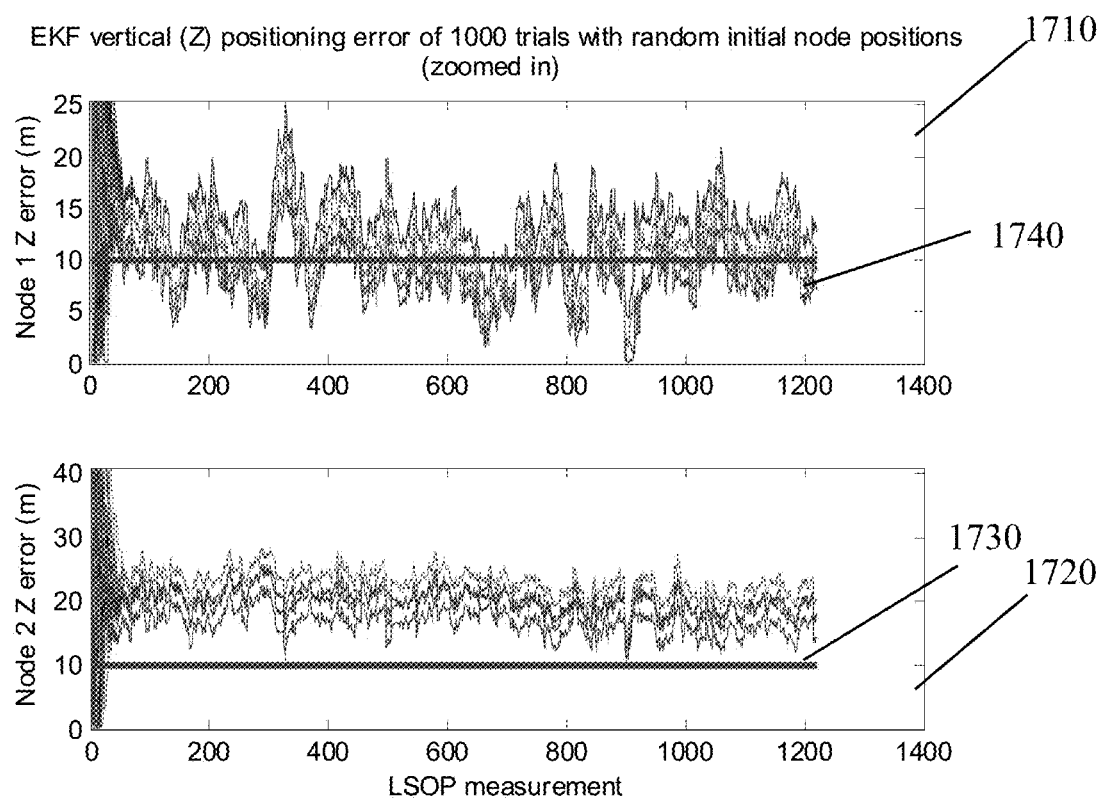
FIG. 17 is a graph of EKF vertical positioning error of 1000 trials with random initial node positions.
Figure 18:
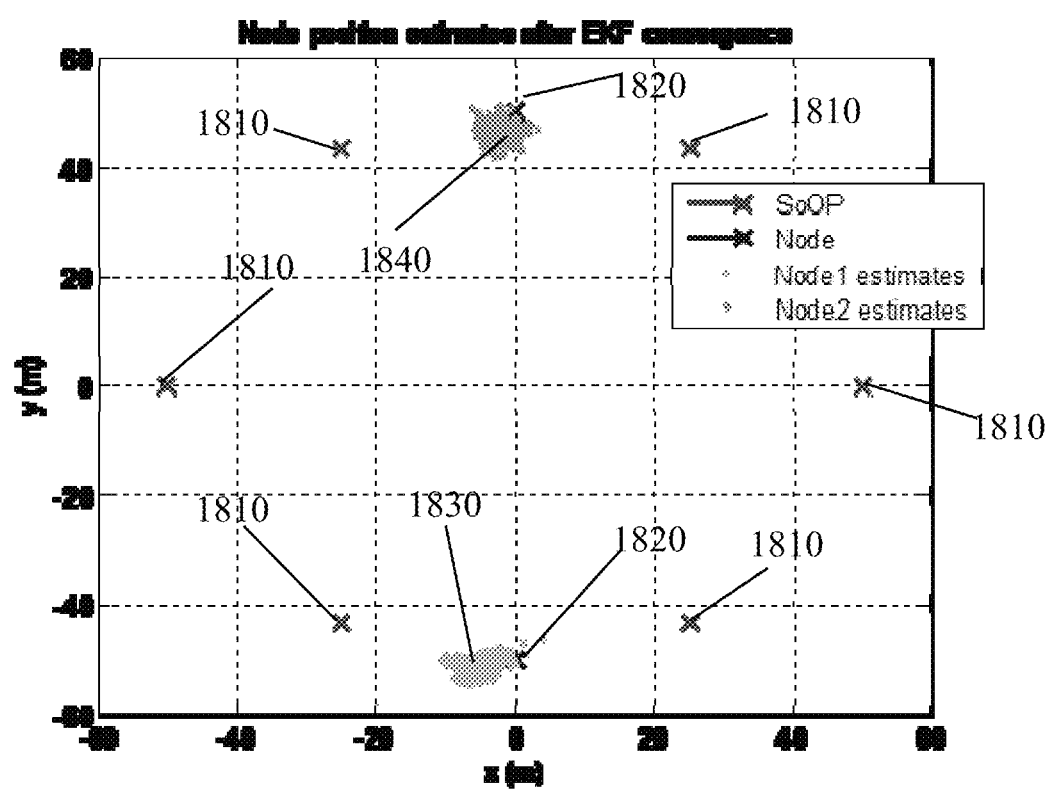
FIG. 18 is an X-Y plot for EKF position estimates for LSOP measurements after EKF convergence.
Figure 19:
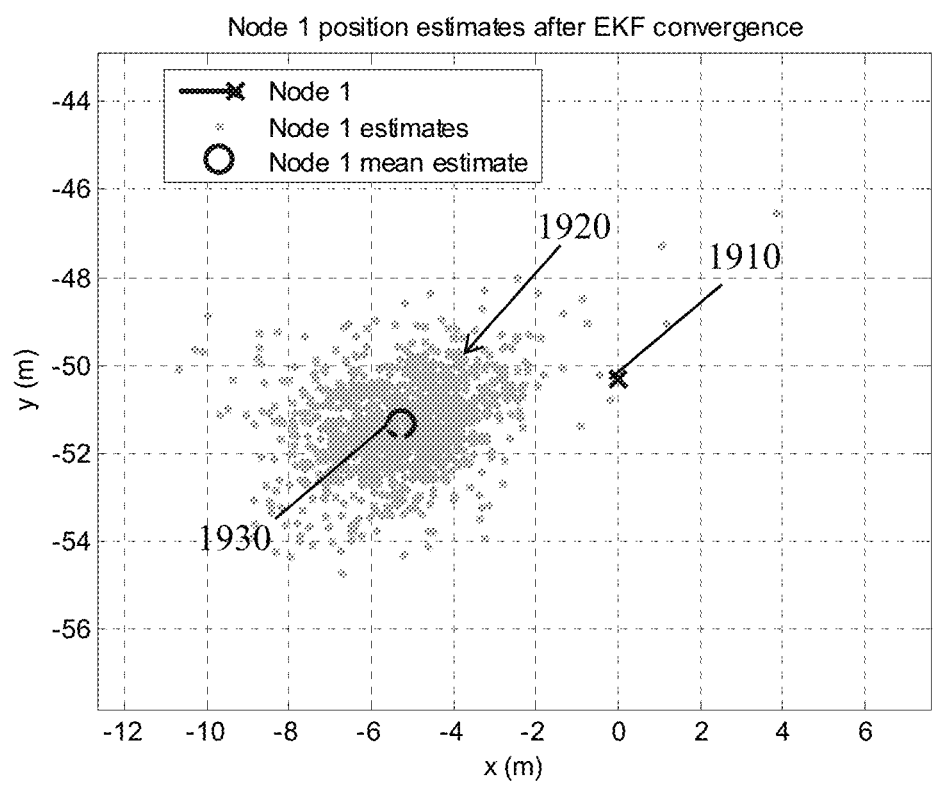
FIG. 19 is a zoomed-in X-Y plot of EKF Node-1 position estimates after EKF convergence.
Figure 20:
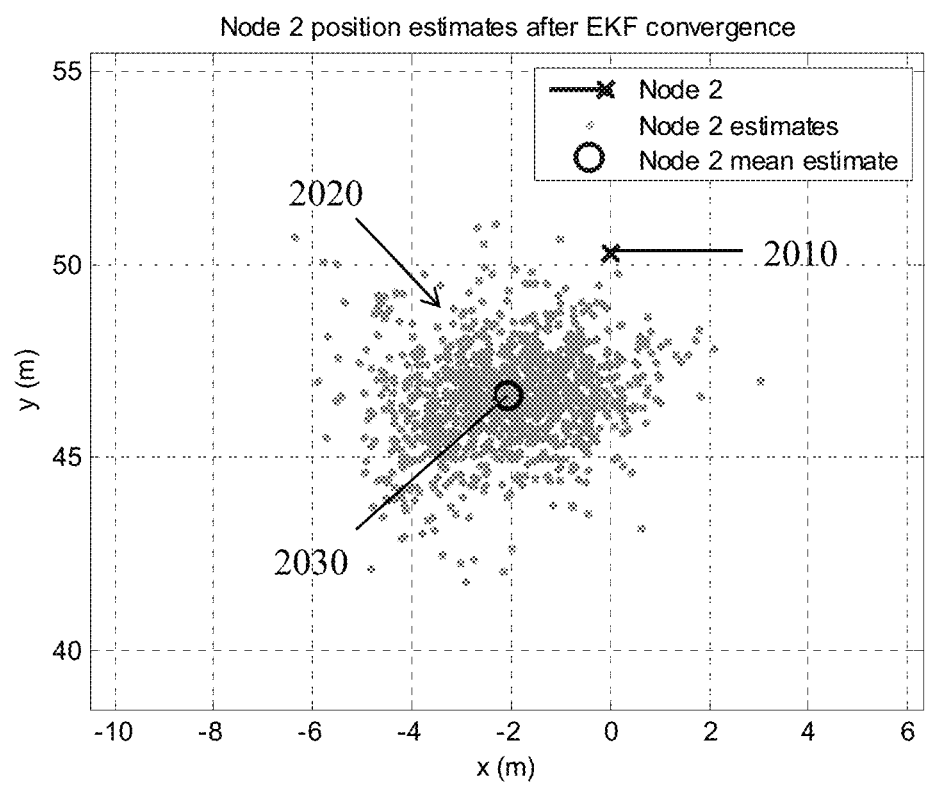
FIG. 20 is a zoomed-in X-Y plot of EKF Node-2 position estimates after EKF convergence.

With the acquired data, the TDOA/TOF information of the problem geometry was derived using the technique and was input to an Extended Kalman Filter. 1000 trials of the EKF were run with random initial node position guesses and using the derived TDOA/TOF values. All 1000 1640/1740 trials converged as shown in FIG. 16 and FIG. 17 for node 1 1610, 1710 and node 2 1620, 1720. Horizontal positioning error (FIG. 16) was below 10 m 1630/1730. As discussed above, vertical positioning error was often above 10 m (FIG. 17). Convergence was quick at approximately 40 measurements. FIG. 18, FIG. 19 and FIG. 20 show plots of EKF position estimates for node 1 and node 2 1830, 1840 for the LSOP measurements after EKF convergence, plotted against actual node positions 1820 and SoOP positions 1810. FIG. 19 is a close-up of the node 1 estimates, showing individual estimates 1920, mean estimate 1930 and actual location 1910. FIG. 20 is a close-up of the node 2 estimates, showing individual estimates 2020, mean estimate 2030 and actual location 2010.

The invention is not limited to the particular embodiments described above in detail. Those skilled in the art will recognize that other arrangements could be devised. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the scope of the invention as set forth in the following claims.

We claim:
1. An asynchronous localization method, comprising:
   in a network of nodes and one or more transmitters, including a first pair of nodes and a first transmitter, the position of at least one of the nodes in the first pair of nodes and/or the first transmitter being known as a default state of the network, for the first pair of nodes and the first transmitter:
   (a) receiving a first signal directly from the first transmitter at a first node of the first pair of nodes,
   (b) receiving the first signal relayed from a second node of the first pair of nodes at the first node;
   (c) determining the delay at the first node between the direct first signal and the relayed first signal by comparing the direct and relayed first signals;

(d) determining at least one of the time difference of arrival and time of flight between the first and second nodes of the first node pair, in part using the determined delay at the first node;

(e) receiving a second signal directly from the first transmitter at the second node of the first pair of nodes;

(f) receiving the second signal relayed from the first node of the first pair of nodes at the second node;

(g) determining the delay at the second node between the direct second signal and the relayed second signal by comparing the direct and relayed second signals;

wherein at least one of the first and second nodes in the first pair of nodes has an unknown location;

repeating steps (a) through (g) for one or more additional ones of the transmitters and/or one or more additional pairs of the nodes having at least one node of unknown position, and/or repeating steps (a) through (d) for one or more additional pairs of the nodes having known positions and determining time of flight between the one or more additional pairs of the nodes having known positions based on their known positions;

generating a first set of values for the time difference of arrival and a second set of values for the time of flight; and calculating, using the first set of values and the second set of values, a position of a desired node and/or transmitter, wherein both the network of nodes and the one or more transmitters are unsynchronized.

2. The method of claim 1, wherein the first transmitter is a source of acoustic energy or non-RF electromagnetic energy.

3. The method of claim 1, wherein each of the nodes is configured to multiplex three transceiver functions: receiving a signal directly from one of the transmitters, transmitting a relay of the signal received directly from the one transmitter to one or more other nodes, and receiving from others of the nodes one or more relays of the signal received directly from the one transmitter by the others of the nodes.

4. The method of claim 1, further comprising determining the position of N nodes in D dimensions, wherein positions of the transmitters are known and the number of transmitters Q is greater than or equal to $(N(2D+1-N))/([2(N-1)])$.

5. The method of claim 4, wherein N is at least four, D is three, and Q is only two.

6. The method of claim 1, wherein the one or more transmitters consist of at least three transmitters with known three-dimensional locations and the nodes comprise a single node having a known location, further comprising determining the three-dimensional location of all other nodes in the network.

7. The method of claim 1, wherein the one or more transmitters consist of at least two transmitters with known two-dimensional locations and the nodes comprise a single node having a known location, further comprising determining the two-dimensional location of all other nodes in the network.

8. The method of claim 7, wherein one of the transmitters is a radar target passively transmitting a reflected signal.

9. The method of claim 1, further comprising using additional sensor information and/or prior knowledge to increase fidelity of positioning and/or reduce the number of transmitters required for positioning.

10. The method of claim 9, wherein the additional sensor information comprises angle-of-arrival of transmitter signals, velocity and orientation via Inertial Measurement Unit (IMU), incomplete but useable GPS measurements, direction of magnetic north via compass, orientation to celestial objects (e.g. sun, moon, stars) with date/time known, and/or polarization of the sky due to Rayleigh scattering within the atmosphere, and the prior knowledge comprises Geographic Information Systems information, Digital Terrain Elevation Data, Land Cover Land Use information, reconnaissance information, a physical model of node kinematics, transmitter locations and waveforms, a priori rough estimate of location of operation, and/or weather forecasts.

11. The method of claim 1, wherein the one or more transmitters transmit signals of opportunity.

12. The method of claim 11, wherein the signals of opportunity are wireless signals that are emitted for purposes other than navigation but may be intercepted and used for navigation.

13. The method of claim 11, wherein the signals of opportunity originate from one or more sources of propagating energy that are not purposefully directed towards any of the nodes in the network of nodes.

14. The method of claim 1, wherein each of the nodes in the first pair of nodes is a handheld receiver.

15. The method of claim 1, wherein each of the nodes in the first pair of nodes is non-stationary.

16. The method of claim 1, wherein each of the nodes in the first pair of nodes is capable of being physically moved from a first location to a second location by a user.

17. The method of claim 1, wherein at least one node in the network of nodes is a different physical device than the one or more transmitters.

18. An asynchronous localization method, comprising:

in a network of nodes and one or more transmitters, including a first pair of nodes and a first transmitter, the position of at least one of the nodes in the first pair of nodes and/or the first transmitter being known as a default state of the network, for the first pair of nodes and the first transmitter:

(a) receiving a first signal directly from the first transmitter at a first node of the first pair of nodes, (b) receiving the first signal relayed from a second node of the first pair of nodes at the first node;

(c) determining the delay at the first node between the direct first signal and the relayed first signal by comparing the direct and relayed first signals;

(d) determining at least one of the time difference of arrival and time of flight between the first and second nodes of the first node pair, in part using the determined delay at the first node, and wherein positions of the first and second nodes are known, determining time of flight between the first and second nodes based on their known positions, wherein determining at least one of the time difference of arrival and time of flight between the first and second nodes of the first node pair comprises determining the time difference of arrival between the first and second nodes using the delay at the first node and the determined time of flight between the first and second nodes;

repeating steps (a) through (d) for one or more additional pairs of the nodes having known positions and determining time of flight between the one or more additional pairs of the nodes having known positions based on their known positions, and/or repeating for one or more additional pairs of the nodes having at least one node of unknown position steps (a) through (d) and further steps of (e) receiving a second signal directly from the first transmitter at the second node of the first pair of nodes, (f) receiving the second signal relayed from the first node of the first pair of nodes at the second node, (g) determining the delay at the second node between the direct second signal and the relayed second signal by comparing the direct and relayed second signals, and (h) determining the time difference of arrival and time of flight between the first and second nodes using the delay at the first node and the delay at the second node;

generating a first set of values for the time difference of arrival and a second set of values for the time of flight; and calculating, using the first set of values and the second set of values, a position of a desired node and/or transmitter, wherein both the network of nodes and the one or more transmitters are unsynchronized.

19. The method of claim 18, further comprising determining a D-dimensional position of each of the transmitters, wherein the nodes consist of at least D+1 nodes of known location.

20. The method of claim 18, wherein the nodes comprise at least four nodes of known location, further comprising determining a three-dimensional position of all the transmitters.

21. The method of claim 18, wherein the nodes comprise at least three nodes of known location, further comprising determining a two-dimensional position of all the nodes in the network using the time of flight determinations.

22. An asynchronous localization method, comprising:
in a network of nodes and one or more transmitters, including a first pair of nodes and a first transmitter, the position of at least one of the nodes in the first pair of nodes and/or the first transmitter being known, the position of at least one of the first and second nodes in the first pair of nodes being unknown, for the first pair of nodes and the first transmitter:
(a) receiving a first signal directly from the first transmitter at a first node of the first pair of nodes;
(b) receiving the first signal relayed from a second node of the first pair of nodes at the first node;
(c) determining the delay at the first node between the direct first signal and the relayed first signal by comparing the direct and relayed first signals;
(d) determining at least one of the time difference of arrival and time of flight between the first and second nodes of the first node pair, in part using the determined delay at the first node;

wherein determining at least one of the time difference of arrival and time of flight between the first and second nodes of the first node pair comprises determining the time of flight between the first and second nodes, further comprising communicating a state $T_1$ of the first node's clock to the second node, determining a state $T_{12}$ of the second node's clock when the state $T_1$ of the first node's clock is received at the second node, subtracting the determined time of flight between the first node and the second node from $T_{12}$ to determine a state $T_2$ of the second node's clock when the state of the first node's clock was $T_1$, subtracting $T_1$ from $T_2$ to determine an offset between the two nodes' clocks, and applying the offset to synchronize the clocks of the first node and the second node.

* * * * *